US012579619B2

(12) United States Patent
Scharam et al.

(10) Patent No.: US 12,579,619 B2
(45) Date of Patent: Mar. 17, 2026

(54) IMAGE EFFECT RENDERING

(71) Applicant: QUALCOMM Incorporated, San Diego, CA (US)

(72) Inventors: Eran Scharam, Misgav (IL); Tomer Livneh, Pardes Hana-Karkur (IL); Esther Toledano, Kiryat yam (IL); Diana Shaposhnik, Haifa (IL); Oren Shirak, Atlit (IL); Yan Gershfeld, Acco (IL)

(73) Assignee: QUALCOMM Incorporated, San Diego, CA (US)

( * ) Notice: Subject to any disclaimer, the term of this patent is extended or adjusted under 35 U.S.C. 154(b) by 397 days.

(21) Appl. No.: 18/309,445

(22) Filed: Apr. 28, 2023

(65) Prior Publication Data

US 2024/0177274 A1     May 30, 2024

Related U.S. Application Data

(60) Provisional application No. 63/383,650, filed on Nov. 14, 2022.

(51) Int. Cl.
*G06T 5/70*     (2024.01)
*G06T 5/20*     (2006.01)
*G06T 5/50*     (2006.01)

(52) U.S. Cl.
CPC ................. *G06T 5/70* (2024.01); *G06T 5/20* (2013.01); *G06T 5/50* (2013.01); *G06T 2200/24* (2013.01); *G06T 2207/20221* (2013.01)

(58) Field of Classification Search
CPC .... G06T 5/70; G06T 5/20; G06T 5/50; G06T 2200/24; G06T 2207/20221;
(Continued)

(56) References Cited

U.S. PATENT DOCUMENTS 10,992,845 B1 *   4/2021   Seely ................... H04N 5/2226
2013/0315478 A1 *   11/2013   Schiller ................... G06T 11/60
                                                        382/159

(Continued)

FOREIGN PATENT DOCUMENTS

EP          3005286 B1 *   9/2019   ........... H04N 23/951
JP          H05346946 A     12/1993

OTHER PUBLICATIONS

Georgiadis K., et al., "Adaptive Mask-based Pyramid Network for Realistic Bokeh Rendering", arXiv:2210.16078v1 [cs.CV], arxiv. org, Cornell University Library, 201 Olin Library Cornell University Ithaca, NY 14853, Oct. 28, 2022, pp. 1-16, XP091356397, Abstract, Figure 1.
Partial International Search Report—PCT/US2023/078676—ISA/EPO—Feb. 9, 2024.

(Continued)

*Primary Examiner* — Jose L Couso
(74) *Attorney, Agent, or Firm* — QUALCOMM Incorporated

(57) ABSTRACT

This disclosure provides systems, methods, and devices for image signal processing that support hardware-based photographic and videographic effects. In a first aspect, a method of image processing includes receiving, by an image signal processor, first image data; and determining an output image frame based on the first image data by applying a photographic effect to a first image frame of the first image data in the image signal processor. Other aspects and features are also claimed and described.

26 Claims, 16 Drawing Sheets

(58) Field of Classification Search
CPC ......... G06T 2207/20016; G06T 3/4053; G06T
2207/20201; G06T 5/73; G06T 7/73;
G06T 2207/10004; G06T 2207/10016;
G06T 3/18; G06T 15/503; G06T 5/80;
G06T 3/4046; G06T 5/60; G06T 9/002;
G06T 2207/20076; G06T 2207/20081;
G06T 2207/20084; H04N 5/2621; H04N
23/80; H04N 19/117; H04N 19/59; H04N
19/33; H04N 19/36; H04N 19/80; H04N
7/00117; G06N 3/02; G06N 3/08–088;
G06N 3/0445; G06N 3/0454; G06N
3/0464; G06N 3/4046; G06N 3/4053;
G06N 7/00; G06N 7/01; G06N 20/00;
G06K 7/1482; G06V 10/454; G06V
10/54; G06V 10/774; G06V 10/82; G06V
20/41; G06V 30/18057; G06V 20/698;
G06V 30/19173; G06F 18/214; G06F
18/22; G06F 18/241; G06F 18/24; G06F
18/2411; G06F 18/2415; G06F 30/27;
Y10S 128/925
See application file for complete search history.

(56) References Cited

U.S. PATENT DOCUMENTS

| | | | | |
|---|---|---|---|---|
| 2018/0350043 A1* | 12/2018 | Seely | ........................ | G06T 5/70 |
| 2020/0143520 A1* | 5/2020 | Suszek | ....................... | G06T 3/40 |
| 2021/0166350 A1* | 6/2021 | Wang | ........................ | G06T 5/73 |
| 2021/0233210 A1* | 7/2021 | Elron | .................... | G06T 3/4046 |
| 2022/0122223 A1* | 4/2022 | Choi | ......................... | G06T 5/70 |
| 2022/0156883 A1* | 5/2022 | Pottorff | ................ | G06T 3/4046 |

OTHER PUBLICATIONS

International Search Report and Written Opinion—PCT/US2023/
078676—ISA/EPO—Apr. 4, 2024.

* cited by examiner

*300*

302

RECEIVE FIRST IMAGE DATA COMPRISING A FIRST IMAGE FRAME AS INPUT TO IMAGE SIGNAL PROCESSOR

304

APPLY BLUR TO PORTIONS OF THE FIRST IMAGE FRAME IN THE IMAGE SIGNAL PROCESSOR

306

DETERMINE OUTPUT IMAGE FRAMES BASED ON THE BLURRED FIRST IMAGE FRAME

IMAGE EFFECT RENDERING

CROSS-REFERENCE TO RELATED APPLICATIONS

This application claims the benefit of U.S. Provisional Patent Application No. 63/383,650, entitled, "SPECIAL EFFECTS RENDERING IN HARDWARE," filed on Nov. 14, 2022, which is expressly incorporated by reference herein in its entirety.

TECHNICAL FIELD

Aspects of the present disclosure relate generally to image processing, and more particularly, to image effects (including photographic effects and videographic effects). Some features may enable and provide improved image processing, including selective addition of blurring to an image.

INTRODUCTION

Image capture devices are devices that can capture one or more digital images, whether still images for photos or sequences of images for videos. Capture devices can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

In certain scenes, a photographer may desire to direct the viewer's focus to one portion of the scene. For example, in a portrait photograph of a person, the photographer may desire for the viewer to focus on the person, rather than other scenery. The photographer may choose a low aperture lens for such a photograph, because the low aperture results in objects at different depths than the person to be significantly blurred. Lower aperture lenses produce higher blurring than higher aperture lenses. However, lower aperture lenses generally are larger in size and made from higher-cost materials.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

A A mobile phone camera lens is usually too small to have a shallow depth of field desired for creating a photograph with the Bokeh effect as an optical effect. Data processing may be applied to image data to create the Bokeh effect artificially using a depth map and computational photography. Software-based solutions are limited in resolution due to performance limitations of processing devise and latency requirements for real-time output. Further, software-based solutions consume a lot of power due to the intensive usage of a central processing unit (CPU) and/or graphics processing unit (GPU). In some aspects of this disclosure, the application of blurring to an image frame may be performed in hardware through, for example, dedicated or shared blocks of an image processing engine (IPE) of a data flow through an image signal processor (ISP).

Effects such as the Bokeh effect applied in the hardware of, e.g., an image signal processor provide improved resolution and latency over software-based solutions for photographic effects. In some embodiments, a blur engine is integrated into the camera ISP pipeline. This hardware engine implements an algorithm of pixel spreading, emulating the optical blur effect, which occurs in out of focus areas, when using a lens with low aperture. The engine may include a special logic supporting configurable aperture shapes, which creates distinctive shapes in bright point light sources. The engine may also include logic for improving map accuracy and creating a uniform noise level after blurring, to emulate better the optical effect. The hardware implementation may provide an advantage in both performance and power consumption, supporting rendering at higher resolutions (e.g., 4K or 8K) and at higher frame rates (e.g., 30 fps or 60 fps). Applying the effects, such as Bokeh rendering, as part of the regular video processing, allows other video features applied in hardware to be combined with the Bokeh rendering, such as stabilization, zoom, artificial intelligence (AI)-camera modification, etc.

In one aspect of the disclosure, a method for image processing includes receiving, by an image signal processor, first image data; and determining, by the image signal processor, an output image frame based on the first image data by applying a photographic effect to a first image frame of the first image data, wherein applying the photographic effect comprises performing a blurring operation on the first image data by logic circuitry of the image signal processor.

In an additional aspect of the disclosure, an apparatus includes at least one image signal processor and a memory coupled to the at least one image signal processor. The at least one image signal processor is configured to perform operations including receiving, by an image signal processor, first image data; and determining, by the image signal processor, an output image frame based on the first image data by applying a photographic effect to a first image frame of the first image data, wherein applying the photographic effect comprises performing a blurring operation on the first image data by logic circuitry of the image signal processor.

In an additional aspect of the disclosure, an apparatus includes means for receiving, by an image signal processor, first image data; and means for determining, by the image signal processor, an output image frame based on the first image data by applying a photographic effect to a first image frame of the first image data, wherein applying the photographic effect comprises performing a blurring operation on the first image data by logic circuitry of the image signal processor.

In an additional aspect of the disclosure, a non-transitory computer-readable medium stores instructions that, when executed by a processor, cause the processor to perform operations. The operations include receiving, by an image signal processor, first image data; and determining, by the image signal processor, an output image frame based on the first image data by applying a photographic effect to a first image frame of the first image data, wherein applying the photographic effect comprises performing a blurring operation on the first image data by logic circuitry of the image signal processor.

Methods of image processing described herein may be performed by an image capture device and/or performed on image data captured by one or more image capture devices.

Image capture devices, devices that can capture one or more digital images, whether still image photos or sequences of images for videos, can be incorporated into a wide variety of devices. By way of example, image capture devices may comprise stand-alone digital cameras or digital video camcorders, camera-equipped wireless communication device handsets, such as mobile telephones, cellular or satellite radio telephones, personal digital assistants (PDAs), panels or tablets, gaming devices, computing devices such as webcams, video surveillance cameras, or other devices with digital imaging or video capabilities.

The image processing techniques described herein may involve digital cameras having image sensors and processing circuitry (e.g., application specific integrated circuits (ASICs), digital signal processors (DSP), graphics processing unit (GPU), neural processing units (NPU), or central processing units (CPU)). An image signal processor (ISP) may include one or more of these processing circuits and configured to perform operations to obtain the image data for processing according to the image processing techniques described herein and/or involved in the image processing techniques described herein. The ISP may be configured to control the capture of image frames from one or more image sensors and determine one or more image frames from the one or more image sensors to generate a view of a scene in an output image frame. The output image frame may be part of a sequence of image frames forming a video sequence. The video sequence may include other image frames received from the image sensor or other images sensors.

In an example application, the image signal processor (ISP) may receive an instruction to capture a sequence of image frames in response to the loading of software, such as a camera application, to produce a preview display from the image capture device. The image signal processor may be configured to produce a single flow of output image frames, based on images frames received from one or more image sensors. The single flow of output image frames may include raw image data from an image sensor, binned image data from an image sensor, or corrected image data processed by one or more algorithms within the image signal processor. For example, an image frame obtained from an image sensor, which may have performed some processing on the data before output to the image signal processor, may be processed in the image signal processor by processing the image frame through an image post-processing engine (IPE) and/or other image processing circuitry for performing one or more of tone mapping, portrait lighting, contrast enhancement, gamma correction, etc. The output image frame from the ISP may be stored in memory and retrieved by an application processor executing the camera application, which may perform further processing on the output image frame to adjust an appearance of the output image frame and reproduce the output image frame on a display for view by the user.

After an output image frame representing the scene is determined by the image signal processor and/or determined by the application processor, such as through image processing techniques described in various embodiments herein, the output image frame may be displayed on a device display as a single still image and/or as part of a video sequence, saved to a storage device as a picture or a video sequence, transmitted over a network, and/or printed to an output medium. For example, the image signal processor (ISP) may be configured to obtain input frames of image data (e.g., pixel values) from the one or more image sensors, and in turn, produce corresponding output image frames (e.g., preview display frames, still-image captures, frames for video, frames for object tracking, etc.). In other examples, the image signal processor may output image frames to various output devices and/or camera modules for further processing, such as for 3 A parameter synchronization (e.g., automatic focus (AF), automatic white balance (AWB), and automatic exposure control (AEC)), producing a video file via the output frames, configuring frames for display, configuring frames for storage, transmitting the frames through a network connection, etc. Generally, the image signal processor (ISP) may obtain incoming frames from one or more image sensors and produce and output a flow of output frames to various output destinations.

In some aspects, the output image frame may be produced by combining aspects of the image correction of this disclosure with other computational photography techniques such as high dynamic range (HDR) photography or multi-frame noise reduction (MFNR). With HDR photography, a first image frame and a second image frame are captured using different exposure times, different apertures, different lenses, and/or other characteristics that may result in improved dynamic range of a fused image when the two image frames are combined. In some aspects, the method may be performed for MFNR photography in which the first image frame and a second image frame are captured using the same or different exposure times and fused to generate a corrected first image frame with reduced noise compared to the captured first image frame.

In some aspects, a device may include an image signal processor or a processor (e.g., an application processor) including specific functionality for camera controls and/or processing, such as enabling or disabling the binning module or otherwise controlling aspects of the image correction. The methods and techniques described herein may be entirely performed by the image signal processor or a processor, or various operations may be split between the image signal processor and a processor, and in some aspects split across additional processors.

The device may include one, two, or more image sensors, such as a first image sensor. When multiple image sensors are present, the image sensors may be differently configured. For example, the first image sensor may have a larger field of view (FOV) than the second image sensor, or the first image sensor may have different sensitivity or different dynamic range than the second image sensor. In one example, the first image sensor may be a wide-angle image sensor, and the second image sensor may be a tele image sensor. In another example, the first sensor is configured to obtain an image through a first lens with a first optical axis and the second sensor is configured to obtain an image through a second lens with a second optical axis different from the first optical axis. Additionally or alternatively, the first lens may have a first magnification, and the second lens may have a second magnification different from the first magnification. Any of these or other configurations may be part of a lens cluster on a mobile device, such as where multiple image sensors and associated lenses are located in offset locations on a frontside or a backside of the mobile device. Additional image sensors may be included with larger, smaller, or same field of views. The image processing techniques described herein may be applied to image frames captured from any of the image sensors in a multi-sensor device.

In an additional aspect of the disclosure, a device configured for image processing and/or image capture is disclosed. The apparatus includes means for capturing image frames. The apparatus further includes one or more means for capturing data representative of a scene, such as image sensors (including charge-coupled devices (CCDs), Bayer-filter sensors, infrared (IR) detectors, ultraviolet (UV) detectors, complimentary metal-oxide-semiconductor (CMOS) sensors) and time of flight detectors. The apparatus may further include one or more means for accumulating and/or focusing light rays into the one or more image sensors (including simple lenses, compound lenses, spherical lenses, and non-spherical lenses). These components may be controlled to capture the first and/or second image frames input to the image processing techniques described herein.

Other aspects, features, and implementations will become apparent to those of ordinary skill in the art, upon reviewing the following description of specific, exemplary aspects in conjunction with the accompanying figures. While features may be discussed relative to certain aspects and figures below, various aspects may include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects may be implemented in various devices, systems, and methods.

The method may be embedded in a computer-readable medium as computer program code comprising instructions that cause a processor to perform the steps of the method. In some embodiments, the processor may be part of a mobile device including a first network adaptor configured to transmit data, such as images or videos in a recording or as streaming data, over a first network connection of a plurality of network connections; and a processor coupled to the first network adaptor and the memory. The processor may cause the transmission of output image frames described herein over a wireless communications network such as a 5G NR communication network.

The foregoing has outlined, rather broadly, the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described aspects. For example, transmission and reception of wireless signals necessarily includes a number of components for analog and digital purposes (e.g., hardware components including antenna, radio frequency (RF)-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Like reference numbers and designations in the various drawings indicate like elements.

DETAILED DESCRIPTION

Figure 1:
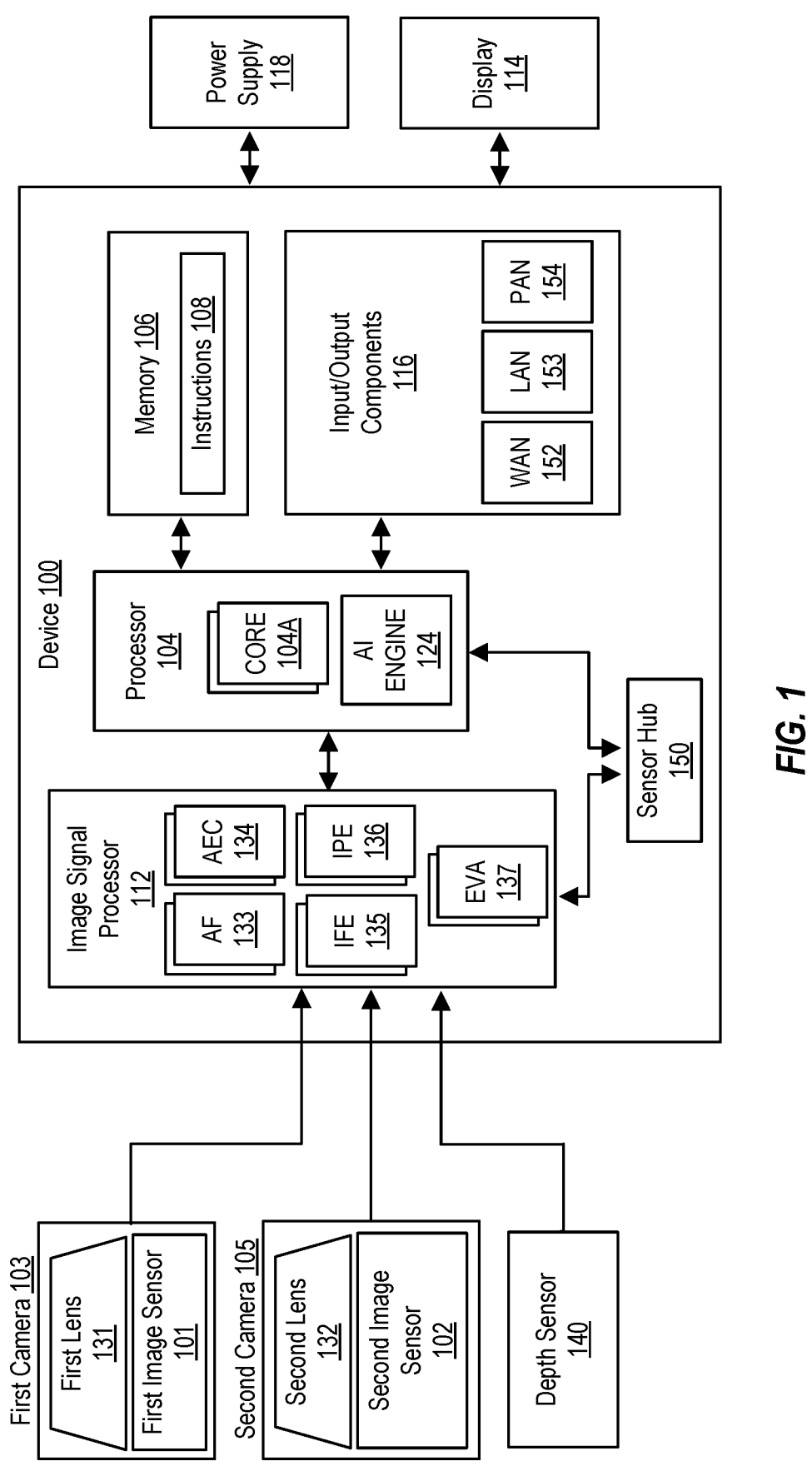
FIG. 1 shows a block diagram of an example device for performing image capture from one or more image sensors.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

The present disclosure provides systems, apparatus, methods, and computer-readable media that support image processing, including techniques for applying shape Bokeh blurs to image frame using hardware processing. For example, some embodiments of image processing hardware may include a blur engine integrated into the camera image signal processor (ISP) pipeline. This hardware (HW) engine implements an algorithm of pixel spreading, which emulates the optical blur effect in out-of-focus areas when using a large aperture. The HW engine may include logic supporting configurable aperture shapes, which creates distinctive shapes in bright point light sources. The HW engine may also include other functionality relating to effects, such as logic for improving map accuracy and creating a uniform noise level after blurring to emulate better the optical effect.

Particular implementations of the subject matter described in this disclosure may be implemented to realize one or more of the following potential advantages or benefits. In some aspects, the present disclosure provides techniques for apply image effects in a more efficient manner to improve performance and reduce power consumption. Further, in performing some or all of the image processing for application of Bokeh or other effects in hardware reduces latency. The reduction in power consumption allows a mobile device to record at higher resolution for longer time periods from battery operation. Higher resolutions increase the number of pixels for processing, and increased hardware processing significantly reduces the amount of processing performed by an application processor. The reduced latency may improve user experience operating a mobile device executing a camera application by reducing the delay between the capture of the image data by the image sensor and the display of the processed data on the device display, which reduces an appearance of "lag" between the display and the real-world.

An example device for capturing image frames using one or more image sensors, such as a smartphone, may include a configuration of one, two, three, four, or more cameras on a backside (e.g., a side opposite a primary user display) and/or a front side (e.g., a same side as a primary user display) of the device. The devices may include one or more image signal processors (ISPs), Computer Vision Processors (CVPs) (e.g., AI engines), or other suitable circuitry for processing images captured by the image sensors. The one or more image signal processors (ISP) may store output image frames in a memory and/or otherwise provide the output image frames to processing circuitry (such as through a bus). The processing circuitry may perform further processing, such as for encoding, storage, transmission, or other manipulation of the output image frames.

As used herein, image sensor may refer to the image sensor itself and any certain other components coupled to the image sensor used to generate an image frame for processing by the image signal processor or other logic circuitry or storage in memory, whether a short-term buffer or longer-term non-volatile memory. For example, an image sensor may include other components of a camera, including a shutter, buffer, or other readout circuitry for accessing individual pixels of an image sensor. The image sensor may further refer to an analog front end or other circuitry for converting analog signals to digital representations for the image frame that are provided to digital circuitry coupled to the image sensor.

In the description of embodiments herein, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure.

Some portions of the detailed descriptions which follow are presented in terms of procedures, logic blocks, processing, and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

In one or more aspects, techniques for supporting image processing may include additional aspects, such as any single aspect or any combination of aspects described below or in connection with one or more other processes or devices described elsewhere herein. In a first aspect, supporting image processing may include an apparatus configured to perform blurring operations according to embodiments of this disclosure in logic circuitry of an image signal processor, in which the logic circuitry may be configured as hardware to execute certain operations or configured as hardware executing firmware to execute certain operations. The apparatus is configured to execute operations comprising receiving, by an image signal processor, first image data; and determining, by the image signal processor, an output image frame based on the first image data by applying a photographic effect to a first image frame of the first image data, wherein applying the photographic effect comprises performing a blurring operation on the first image data by logic circuitry of the image signal processor.

In a second aspect, in combination with the first aspect, the apparatus is further configured to perform operations including receiving an indication of a blur shape, wherein applying the photographic effect comprises applying the blur shape to the first image data during the blurring operation.

In a third aspect, in combination with one or more of the first aspect or the second aspect, receiving the indication of the blur shape comprises receiving a user input to a user interface (UI) indicating the blur shape.

In a fourth aspect, in combination with one or more of the first aspect through the third aspect, receiving the indication of the blur shape comprises receiving an indication of a characteristic of a region of interest in the first image frame and the characteristic corresponds to the blur shape.

In a fifth aspect, in combination with one or more of the first aspect through the fourth aspect, receiving the first image data comprises receiving a higher-resolution image frame, a lower-resolution image frame, and a blur map; and determining the output image frame comprises: performing the blurring operation on the lower-resolution image frame based on the blur map to determine a blurred image frame; and blending the higher-resolution image frame and the blurred image frame.

In a sixth aspect, in combination with one or more of the first aspect through the fifth aspect, the apparatus is further configured to perform operations comprising applying a low pass filter to the higher-resolution image frame to determine a filtered image frame, wherein determining the output image frame comprises blending the higher-resolution image frame, the filtered image frame, and the blurred image frame with the blur map.

In a seventh aspect, in combination with one or more of the first aspect through the sixth aspect, performing the blurring operation comprises applying higher blur to pixels satisfying a criteria based on brightness and lower blur to pixels not satisfying the criteria.

In an eighth aspect, in combination with one or more of the first aspect through the seventh aspect, receiving the first image data comprises receiving the higher-resolution image frame through a first image front end (IFE) of the image signal processor (ISP), receiving the first image data comprises receiving depth information through a second IFE of the ISP, and the blur map is based on the depth information.

In a ninth aspect, in combination with one or more of the first aspect through the eighth aspect, performing the blurring operation comprises applying higher blur to pixels satisfying a criteria based on brightness and lower blur to pixels not satisfying the criteria.

In a tenth aspect, in combination with one or more of the first aspect through the ninth aspect, the apparatus is further configured to perform operations comprising receiving, by an application processor, the output image frame; and executing, by the application processor, a camera application for receiving user input and determining a corrected output image frame based on the output image frame.

Additionally, the apparatus may perform or operate according to one or more aspects as described below. In some implementations, the apparatus includes a wireless device, such as a UE. In some implementations, the apparatus includes a remote server, such as a cloud-based computing solution, which receives image data for processing to determine output image frames. In some other implementations, the apparatus may include a non-transitory computer-readable medium having program code recorded thereon and the program code may be executable by a computer for causing the computer to perform operations described herein with reference to the apparatus. In some implementations, the apparatus may include one or more means configured to perform operations described herein. In some implementations, a method of wireless communication may include one or more operations described herein with reference to the apparatus.

In a second aspect, in combination with the first aspect, the operations may include receiving an indication of a blur shape, wherein applying the photographic effect comprises applying the blur shape to the first image data during the blurring operation.

In a third aspect, in combination with one or more of the first aspect or the second aspect, receiving the indication of the blur shape comprises receiving a user input to a user interface (UI) indicating the blur shape.

In a fourth aspect, in combination with one or more of the first aspect through the third aspect, receiving the indication of the blur shape comprises receiving an indication of a characteristic of a region of interest in the first image frame and the characteristic corresponds to the blur shape.

In a fifth aspect, in combination with one or more of the first aspect through the fourth aspect, receiving the first image data comprises receiving a higher-resolution image frame, a lower-resolution image frame, and a blur map, and determining the output image frame comprises: performing the blurring operation on the lower-resolution image frame based on the blur map to determine a blurred image frame; and blending the higher-resolution image frame and the blurred image frame.

In a sixth aspect, in combination with one or more of the first aspect through the fifth aspect, the operations further include applying a low pass filter to the higher-resolution image frame to determine a filtered image frame, wherein determining the output image frame comprises blending the higher-resolution image frame, the filtered image frame, and the blurred image frame with the blur map.

In a seventh aspect, in combination with one or more of the first aspect through the sixth aspect, performing the blurring operation comprises applying higher blur to pixels satisfying a criteria based on brightness and lower blur to pixels not satisfying the criteria.

In an eighth aspect, in combination with one or more of the first aspect through the seventh aspect, receiving the first image data comprises receiving the higher-resolution image frame through a first image front end (IFE) of the image signal processor (ISP), receiving the first image data comprises receiving depth information through a second IFE of the ISP, and the blur map is based on the depth information.

In a ninth aspect, in combination with one or more of the first aspect through the eighth aspect, performing the blurring operation comprises applying higher blur to pixels satisfying a criteria based on brightness and lower blur to pixels not satisfying the criteria.

In a tenth aspect, in combination with one or more of the first aspect through the ninth aspect, the operations further include receiving, by an application processor, the output image frame; and executing, by the application processor, a camera application for receiving user input and determining a corrected output image frame based on the output image frame.

In additional aspects, a method of image signal processing may include one or more operations of combinations of one or more of the first aspect through the tenth aspect.

In the figures, a single block may be described as performing a function or functions. The function or functions performed by that block may be performed in a single component or across multiple components, and/or may be performed using hardware, software, or a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any electronic device including, coupled to, or otherwise processing data from one, two, or more image sensors capable of capturing image frames (or "frames"). The terms "output image frame" and "corrected image frame" may refer to image frames that have been processed by any of the discussed techniques. Further, aspects of the present disclosure may be implemented in devices having or coupled to image sensors of the same or different capabilities and characteristics (such as resolution, shutter speed, sensor type, and so on). Further, aspects of the present disclosure may be implemented in devices for processing image frames, whether or not the device includes or is coupled to the image sensors, such as processing devices that may retrieve stored images for processing, including processing devices present in a cloud computing system.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating," or the like, refer to the actions and processes of a computer system, or similar electronic computing device, that manipulates and transforms data represented as physical (electronic) quantities within the computer system's registers and memories into other data similarly represented as physical quantities within the computer system's registers, memories, or other such information storage, transmission, or display devices.

The terms "device" and "apparatus" are not limited to one or a specific number of physical objects (such as one smartphone, one camera controller, one processing system, and so on). As used herein, a device may be any electronic device with one or more parts that may implement at least some portions of the disclosure. While the description and examples herein use the term "device" to describe various aspects of the disclosure, the term "device" is not limited to a specific configuration, type, or number of objects. As used herein, an apparatus may include a device or a portion of the device for performing the described operations.

Certain components in a device or apparatus described as "means for accessing," "means for receiving," "means for sending," "means for using," "means for selecting," "means for determining," "means for normalizing," "means for multiplying," or other similarly-named terms referring to one or more operations on data, such as image data, may refer to processing circuitry (e.g., application specific integrated circuits (ASICs), digital signal processors (DSP), graphics processing unit (GPU), central processing unit (CPU)) configured to perform the recited function through hardware, software, or a combination of hardware configured by software.

FIG. 1 shows a block diagram of an example device 100 for performing image capture from one or more image sensors. The device 100 may include, or otherwise be coupled to, an image signal processor 112 for processing image frames from one or more image sensors, such as a first image sensor 101, a second image sensor 102, and a depth sensor 140. In some implementations, the device 100 also includes or is coupled to a processor 104 and a memory 106 storing instructions 108. The device 100 may also include or be coupled to a display 114 and input/output (I/O) components 116. I/O components 116 may be used for interacting with a user, such as a touch screen interface and/or physical buttons.

I/O components 116 may also include network interfaces for communicating with other devices, including a wide area network (WAN) adaptor 152, a local area network (LAN) adaptor 153, and/or a personal area network (PAN) adaptor 154. An example WAN adaptor is a 4G LTE or a 5G NR wireless network adaptor. An example LAN adaptor 153 is an IEEE 802.11 WiFi wireless network adapter. An example PAN adaptor 154 is a Bluetooth wireless network adaptor. Each of the adaptors 152, 153, and/or 154 may be coupled to an antenna, including multiple antennas configured for primary and diversity reception and/or configured for receiving specific frequency bands.

The device 100 may further include or be coupled to a power supply 118 for the device 100, such as a battery or a component to couple the device 100 to an energy source. The device 100 may also include or be coupled to additional features or components that are not shown in FIG. 1. In one example, a wireless interface, which may include a number of transceivers and a baseband processor, may be coupled to or included in WAN adaptor 152 for a wireless communication device. In a further example, an analog front end (AFE) to convert analog image frame data to digital image frame data may be coupled between the image sensors 101 and 102 and the image signal processor 112.

The device may include or be coupled to a sensor hub 150 for interfacing with sensors to receive data regarding movement of the device 100, data regarding an environment around the device 100, and/or other non-camera sensor data. One example non-camera sensor is a gyroscope, a device configured for measuring rotation, orientation, and/or angular velocity to generate motion data. Another example non-camera sensor is an accelerometer, a device configured for measuring acceleration, which may also be used to determine velocity and distance traveled by appropriately integrating the measured acceleration, and one or more of the acceleration, velocity, and/or distance may be included in generated motion data. In some aspects, a gyroscope in an electronic image stabilization system (EIS) may be coupled to the sensor hub or coupled directly to the image signal processor 112. In another example, a non-camera sensor may be a global positioning system (GPS) receiver.

The image signal processor 112 may receive image data, such as used to form image frames. In one embodiment, a local bus connection couples the image signal processor 112 to image sensors 101 and 102 of a first camera 103 and second camera 105, respectively. In another embodiment, a wire interface couples the image signal processor 112 to an external image sensor. In a further embodiment, a wireless interface couples the image signal processor 112 to the image sensor 101, 102.

The first camera 103 may include the first image sensor 101 and a corresponding first lens 131. The second camera may include the second image sensor 102 and a corresponding second lens 132. Each of the lenses 131 and 132 may be controlled by an associated autofocus (AF) algorithm 133 executing in the ISP 112, which adjust the lenses 131 and 132 to focus on a particular focal plane at a certain scene depth from the image sensors 101 and 102. The AF algorithm 133 may be assisted by depth sensor 140.

The first image sensor 101 and the second image sensor 102 are configured to capture one or more image frames.

Lenses 131 and 132 focus light at the image sensors 101 and 102, respectively, through one or more apertures for receiving light, one or more shutters for blocking light when outside an exposure window, one or more color filter arrays (CFAs) for filtering light outside of specific frequency ranges, one or more analog front ends for converting analog measurements to digital information, and/or other suitable components for imaging. The first lens 131 and second lens 132 may have different field of views to capture different representations of a scene. For example, the first lens 131 may be an ultra-wide (UW) lens and the second lens 132 may be a wide (W) lens. The multiple image sensors may include a combination of ultra-wide (high field-of-view (FOV)), wide, tele, and ultra-tele (low FOV) sensors.

That is, each image sensor may be configured through hardware configuration and/or software settings to obtain different, but overlapping, field of views. In one configuration, the image sensors are configured with different lenses with different magnification ratios that result in different fields of view. The sensors may be configured such that a UW sensor has a larger FOV than a W sensor, which has a larger FOV than a T sensor, which has a larger FOV than a UT sensor. For example, a sensor configured for wide FOV may capture fields of view in the range of 64-84 degrees, a sensor configured for ultra-side FOV may capture fields of view in the range of 100-140 degrees, a sensor configured for tele FOV may capture fields of view in the range of 10-30 degrees, and a sensor configured for ultra-tele FOV may capture fields of view in the range of 1-8 degrees.

The camera 103 may be a variable aperture (VA) camera in which the aperture can be controlled to a particular size. Example aperture sizes are f/2.0, f/2.8, f/3.2, f/8.0, etc. Larger aperture values correspond to smaller aperture sizes, and smaller aperture values correspond to larger aperture sizes. The camera 103 may have different characteristics based on the current aperture size, such as a different depth of focus (DOF) at different aperture sizes.

The image signal processor 112 processes image frames captured by the image sensors 101 and 102. While FIG. 1 illustrates the device 100 as including two image sensors 101 and 102 coupled to the image signal processor 112, any number (e.g., one, two, three, four, five, six, etc.) of image sensors may be coupled to the image signal processor 112. In some aspects, depth sensors such as depth sensor 140 may be coupled to the image signal processor 112, and output from the depth sensors are processed in a similar manner to that of image sensors 101 and 102. Example depth sensors include active sensors, including one or more of indirect Time of Flight (iToF), direct Time of Flight (dToF), light detection and ranging (Lidar), mmWave, radio detection and ranging (Radar), and/or hybrid depth sensors, such as structured light. In embodiments without a depth sensor 140, similar information regarding depth of objects or a depth map may be generated in a passive manner from the disparity between two image sensors (e.g., using depth-from-disparity or depth-from-stereo), phase detection auto-focus (PDAF) sensors, or the like. In addition, any number of additional image sensors or image signal processors may exist for the device 100.

In some embodiments, the image signal processor 112 may execute instructions from a memory, such as instructions 108 from the memory 106, instructions stored in a separate memory coupled to or included in the image signal processor 112, or instructions provided by the processor 104. In addition, or in the alternative, the image signal processor 112 may include specific hardware (such as one or more integrated circuits (ICs)) configured to perform one or more operations described in the present disclosure. For example, the image signal processor 112 may include one or more image front ends (IFEs) 135, one or more image post-processing engines 136 (IPEs), one or more auto exposure compensation (AEC) 134 engines, and/or one or more engines for video analytics (EVAs). The AF 133, AEC 134, IFE 135, IPE 136, and EVA 137 may each include application-specific circuitry, be embodied as software code executed by the ISP 112, and/or a combination of hardware and software code executing on the ISP 112.

In some implementations, the memory 106 may include a non-transient or non-transitory computer readable medium storing computer-executable instructions 108 to perform all or a portion of one or more operations described in this disclosure. In some implementations, the instructions 108 include a camera application (or other suitable application) to be executed by the device 100 for generating images or videos. The instructions 108 may also include other applications or programs executed by the device 100, such as an operating system and specific applications other than for image or video generation. Execution of the camera application, such as by the processor 104, may cause the device 100 to generate images using the image sensors 101 and 102 and the image signal processor 112. The memory 106 may also be accessed by the image signal processor 112 to store processed frames or may be accessed by the processor 104 to obtain the processed frames. In some embodiments, the device 100 does not include the memory 106. For example, the device 100 may be a circuit including the image signal processor 112, and the memory may be outside the device 100. The device 100 may be coupled to an external memory and configured to access the memory for writing output frames for display or long-term storage. In some embodiments, the device 100 is a system-on-chip (SoC) that incorporates the image signal processor 112, the processor 104, the sensor hub 150, the memory 106, and input/output components 116 into a single package.

In some embodiments, at least one of the image signal processor 112 or the processor 104 executes instructions to perform various operations described herein, including depth-of-focus blur, Bokeh effects, etc. operations. For example, execution of the instructions can instruct the image signal processor 112 to begin or end capturing an image frame or a sequence of image frames, in which the capture includes blur as described in embodiments herein. In some embodiments, the processor 104 may include one or more general-purpose processor cores 104A capable of executing scripts or instructions of one or more software programs, such as instructions 108 stored within the memory 106. For example, the processor 104 may include one or more application processors configured to execute the camera application (or other suitable application for generating images or video) stored in the memory 106.

In executing the camera application, the processor 104 may be configured to instruct the image signal processor 112 to perform one or more operations with reference to the image sensors 101 or 102. For example, a camera application executing on processor 104 may receive a user command to begin a video preview display upon which a video comprising a sequence of image frames is captured and processed from one or more image sensors 101 or 102 through the image signal processor 112. Image processing to generate "output" or "corrected" image frames, such as according to techniques described herein, may be applied to one or more image frames in the sequence. Execution of instructions 108 outside of the camera application by the processor 104 may also cause the device 100 to perform any number of functions or operations. In some embodiments, the processor 104 may include ICs or other hardware (e.g., an artificial intelligence (AI) engine 124 or other co-processor) to offload certain tasks from the cores 104A. The AI engine 124 may be used to offload tasks related to, for example, face detection and/or object recognition. In some other embodiments, the device 100 does not include the processor 104, such as when all of the described functionality is configured in the image signal processor 112.

In some embodiments, the display 114 may include one or more suitable displays or screens allowing for user interaction and/or to present items to the user, such as a preview of the image frames being captured by the image sensors 101 and 102. In some embodiments, the display 114 is a touch-sensitive display. The I/O components 116 may be or include any suitable mechanism, interface, or device to receive input (such as commands) from the user and to provide output to the user through the display 114. For example, the I/O components 116 may include (but are not limited to) a graphical user interface (GUI), a keyboard, a mouse, a microphone, speakers, a squeezable bezel, one or more buttons (such as a power button), a slider, a switch, and so on.

While shown to be coupled to each other via the processor 104, components (such as the processor 104, the memory 106, the image signal processor 112, the display 114, and the I/O components 116) may be coupled to each another in other various arrangements, such as via one or more local buses, which are not shown for simplicity. While the image signal processor 112 is illustrated as separate from the processor 104, the image signal processor 112 may be a core of a processor 104 that is an application processor unit (APU), included in a system on chip (SoC), or otherwise included with the processor 104. While the device 100 is referred to in the examples herein for performing aspects of the present disclosure, some device components may not be shown in FIG. 1 to prevent obscuring aspects of the present disclosure. Additionally, other components, numbers of components, or combinations of components may be included in a suitable device for performing aspects of the present disclosure. As such, the present disclosure is not limited to a specific device or configuration of components, including the device 100.

The exemplary image capture device of FIG. 1 may be operated to obtain improved images by applying selective blurring, such as in logic circuitry within the ISP 112 under control of a camera application executing on the processor 104. One example method of operating one or more cameras, such as camera 103, is shown in FIG. 2 and described below.

Figure 2:
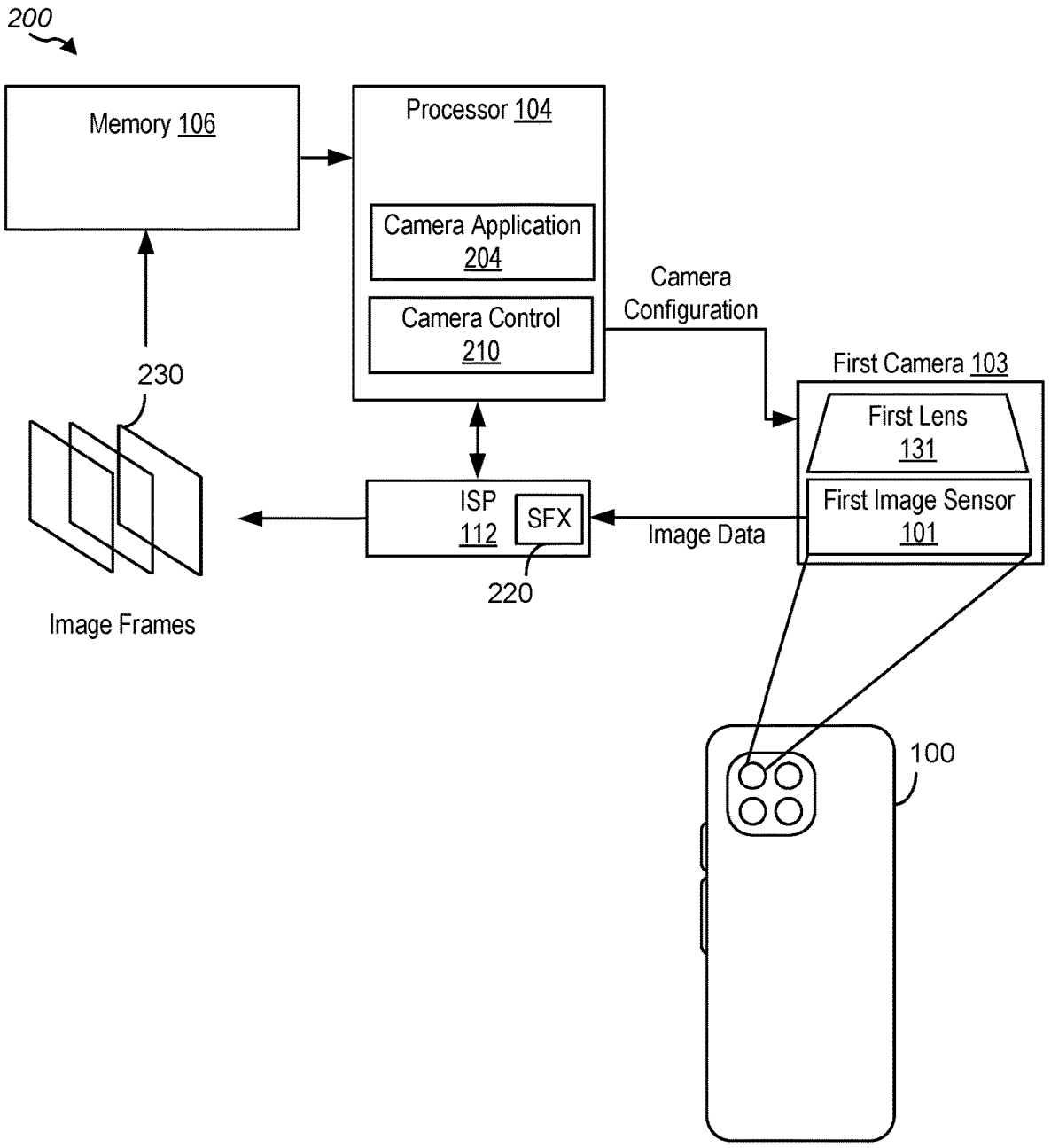
FIG. 2 is a block diagram illustrating an example data flow path for image data processing in an image capture device according to one or more embodiments of the disclosure.

FIG. 2 is a block diagram illustrating an example data flow path for image data processing in an image capture device according to one or more embodiments of the disclosure. A processor 104 of system 200 may communicate with image signal processor (ISP) 112 through a bi-directional bus and/or separate control and data lines. The processor 104 may control camera 103 through camera control 210, such as for configuring the camera 103 through a driver executing on the processor 104. The camera control 210 may be managed by a camera application 204 executing on the processor 104, which provides settings accessible to a user such that a user can specify individual camera settings or select a profile with corresponding camera settings. The camera control 210 communicates with the camera 103 to configure the camera 103 in accordance with commands received from the camera application 204. The camera application 204 may be, for example, a photography application, a document scanning application, a messaging application, or other application that processes image data acquired from camera 103.

The camera configuration may parameters that specify, for example, a frame rate, an image resolution, a readout duration, an exposure level, an aspect ratio, an aperture size, etc. The camera 103 may obtain image data based on the camera configuration. For example, the processor 104 may execute a camera application 204 to instruct camera 103, through camera control 210, to set a first camera configuration for the camera 103, to obtain first image data from the camera 103 operating in the first camera configuration, to instruct camera 103 to set a second camera configuration for the camera 103, and to obtain second image data from camera 103 operating in the second camera configuration.

In some embodiments in which camera 103 is a variable aperture (VA) camera system, the processor 104 may execute a camera application 204 to instruct camera 103 to configure to a first aperture size, obtain first image data from the camera 103, instruct camera 103 to configure to a second aperture size, and obtain second image data from the camera 103. The reconfiguration of the aperture and obtaining of the first and second image data may occur with little or no change in the scene captured at the first aperture size and the second aperture size. Example aperture sizes are f/2.0, f/2.8, f/3.2, f/8.0, etc. Larger aperture values correspond to smaller aperture sizes, and smaller aperture values correspond to larger aperture sizes. That is, f/2.0 is a larger aperture size than f/8.0. The image data received from camera 103 may be processed in one or more blocks of the ISP 112 to form image frames 230 that are stored in memory 106 and/or provided to the processor 104. The processor 104 may further process the image data to apply effects to the image frames 230. Effects may include Bokeh, lighting, color casting, and/or high dynamic range (HDR) merging. In some embodiments, functionality may be embedded in a different component, such as the ISP 112, a DSP, an ASIC, or other custom logic circuit for performing the additional image processing.

The ISP 112 may include hardware special effects (SFX) logic 220 configured for applying effects to the image data received from the camera 103. For example, the SFX logic 220 may include hardware logic circuitry configured to perform blurring operations to apply a Bokeh portrait effect to the image data such that the image frames 230 output from the image processing pipeline of the ISP 112 may have an appearance of a different aperture size or lens configuration than the configuration of the camera 103. In some embodiments, the applied blurring of the SFX logic 220 may be configured by the user through the camera application 204 by setting a desired focal depth, depth of focus, aperture shape, and/or aperture size.

Figure 3:
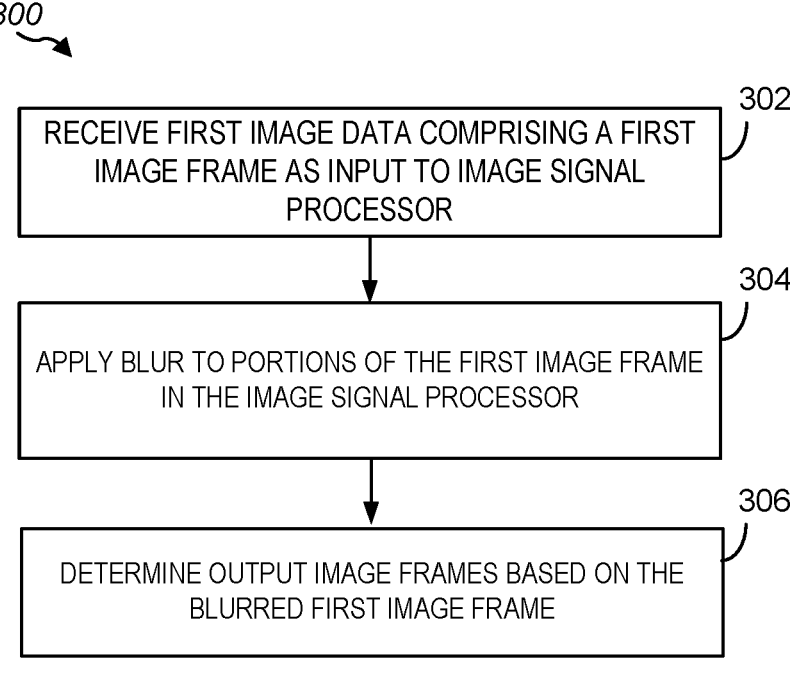
FIG. 3 shows a flow chart of an example method for processing image data to apply Bokeh blur according to some embodiments of the disclosure.

The system 200 of FIG. 2 may be configured to perform the operations described with reference to FIG. 3 to determine output image frames 230. In some embodiments all of the operations of FIG. 3 are executed in the SFX logic 220. FIG. 3 shows a flow chart of an example method for processing image data to apply Bokeh blur according to some embodiments of the disclosure. The capturing in FIG. 3 may obtain an improved digital representation of a scene, which results in a photograph or video with higher image quality (IQ).

At block 302, first image data is received from the image sensor, such as while the image sensor is configured with the camera configuration. The first image data may be received at ISP 112, processed through an image front end (IFE) and/or an image post-processing engine (IPE) of the ISP 112, and stored in memory. In some embodiments, the capture of image data may be initiated by a camera application executing on the processor 104, which causes camera control 210 to activate capture of image data by the camera 103 and cause the image data to be supplied to a processor, such as processor 104 or ISP 112.

At block 304, blur, or another effect, is applied to portions of the first image frame in the hardware of the image signal processor or other hardware component. Although operation on only one image frame is described in FIG. 3, the image processing may be repeated for some or all image frames received from the image sensor. FIGS. 5-13 illustrate aspects of embodiments of the effect processing.

At block 306, output image frames are determined based on the first image data. For example, in some embodiments, additional processing may be applied to the blurred image determined at block 304. Image frames 230 may be determined by the processor 104 or ISP 112 and stored in memory 106. The stored image frames may be read by the processor 104 and used to form a preview display on a display of the device 100 and/or processed to form a video for storage in memory 106 and/or transmission to another device.

Figure 4:
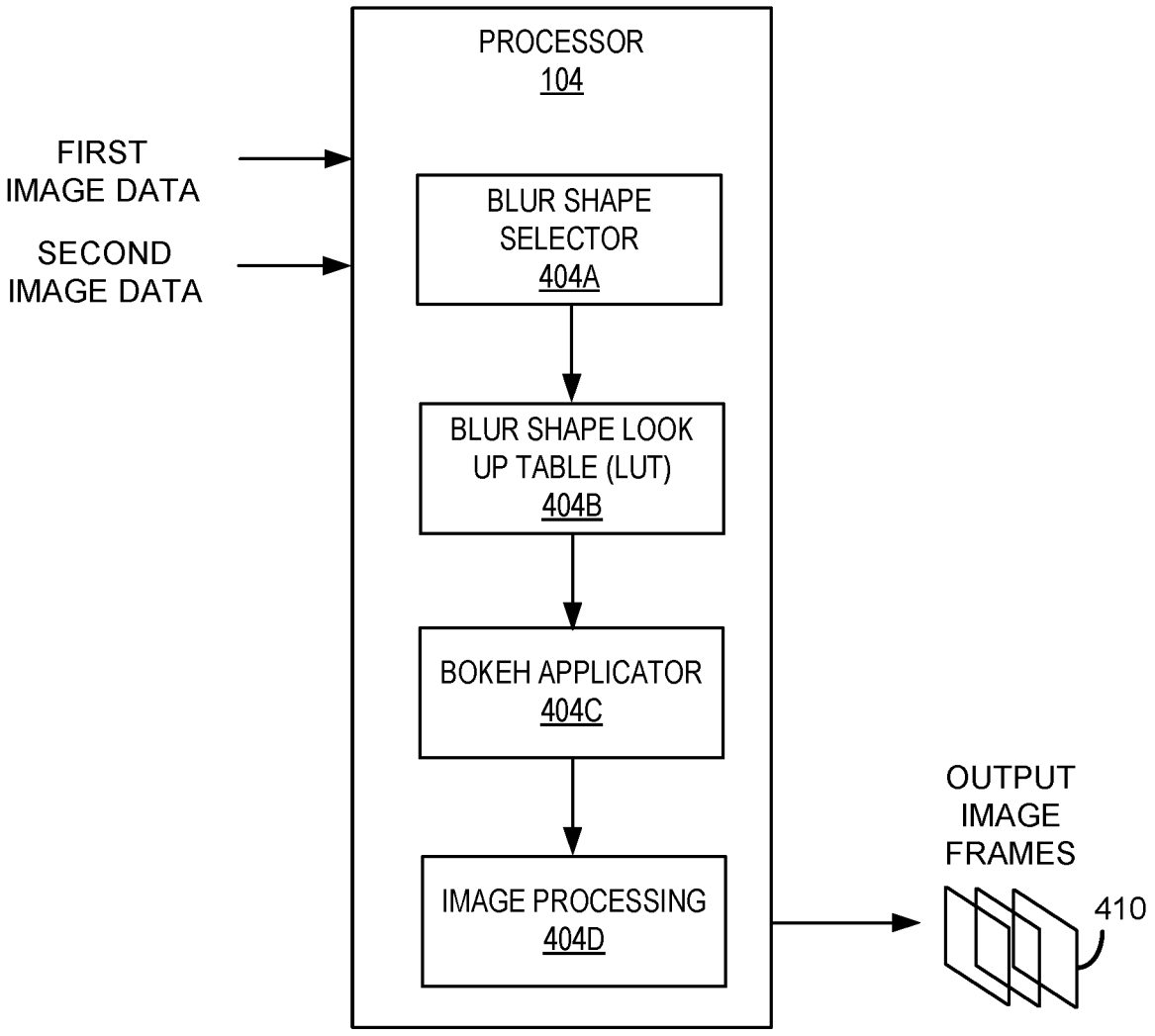
FIG. 4 is a block diagram illustrating an example processor configuration for image data processing in an image capture device according to one or more embodiments of the disclosure.

FIG. 4 is a block diagram illustrating an example processor configuration for image data processing in an image capture device according to one or more embodiments of the disclosure. The processor 104, or other processing circuitry, may be configured to operate on image data to perform one or more operations of the method of FIG. 3. The image data may be processed to determine one or more output image frames 410. The circuitry in the processor 104, which may be an image signal processor (ISP) or other hardware logic circuitry, may include a blur shape selector 404A, which is configured to receive an input indicating one of a plurality of blur shapes to select for applied blur. The processor 104 may also include a blur shape look up table (LUT) 404B, which is configured to access a look-up table based on the indicator received by the blur shape selector 404A to retrieve a kernel comprising weights applied to a plurality of pixels around a center pixel. The blur shape may be selected by an indication received from user input to a user interface. For example, a user may be presented with a gallery of blur shapes to allow a user to indicate a particular blur shape. In some embodiments, the selection of a blur shape may apply the blur shape to live processing of preview image frames through the bokeh applicator 404C to allow the user to see the blur shape effect in real-time. The user may switch between blur shapes and activate a shutter to save a photograph with the applied blur shape. The blur shape may also be selected based on characteristics of an image frame. For example, an image frame may be processed and a characteristic determined for the image frame or a region of interest (ROI) of the image frame, in which the characteristic is used to select a blur shape for the image frame or a future image frame. For example, a portion or the entire image frame may be analyzed to determine an object in the image and matching a blur shape to the detected object. As another example, a portion or the entire image frame may be analyzed to determine a brightness or other characteristic and a blur shape determined based on the brightness or other characteristic. The processor 104 may further include a bokeh applicator 404C, which is configured to applying the retrieved blur shape to first image data and/or second image data received by the processor 104, such as from a camera. The processor 104 may also include further image processing circuitry 404D, which is configured to perform additional image processing such as brightness adjustment, exposure adjustment, and/or portrait lighting adjustments.

Figure 5:
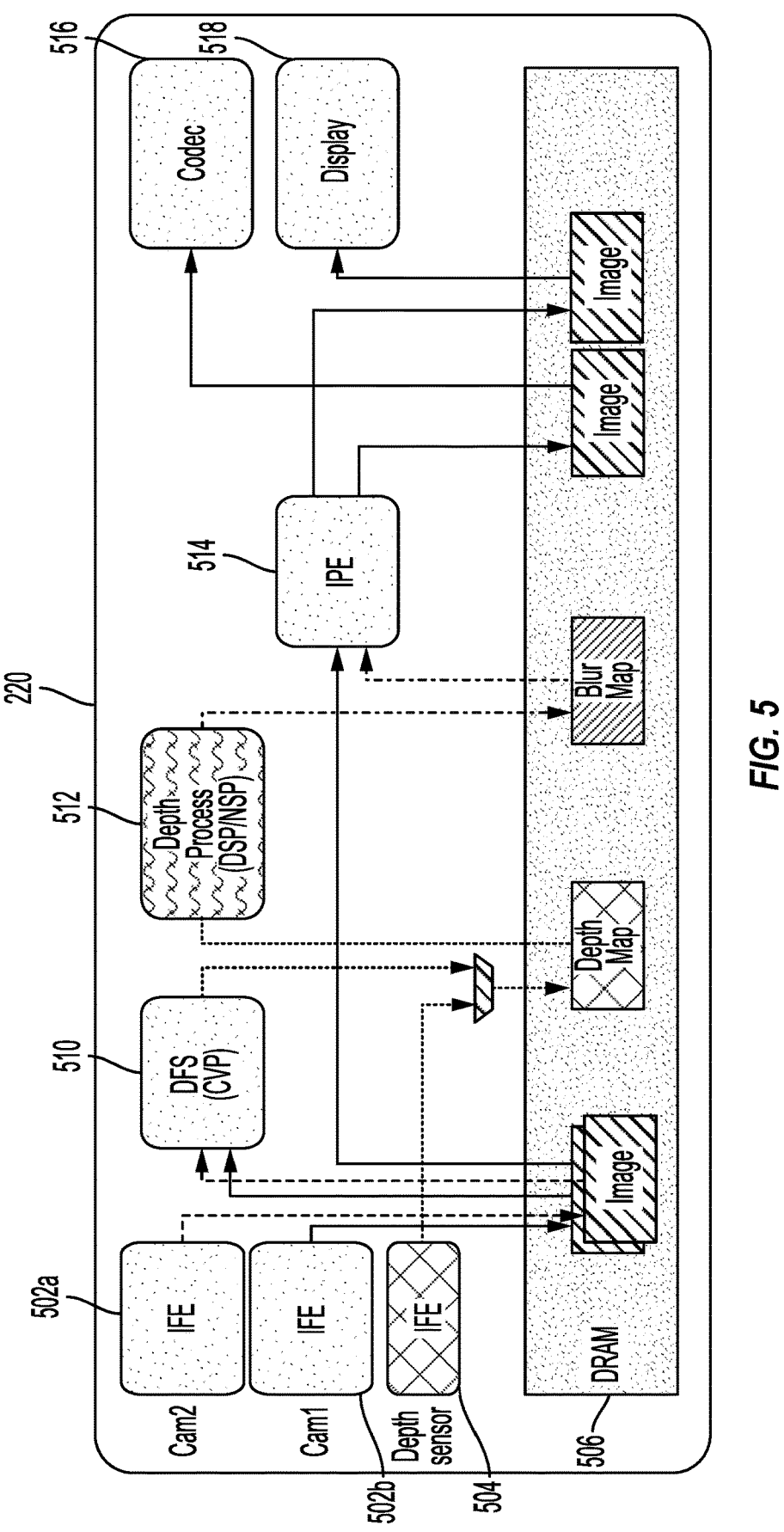
FIG. 5 is a block diagram showing a portion of an image signal processor configured for depth processing to generate a blur map as part of a blurring operation according to one or more embodiments of the disclosure.

One embodiment of logic circuitry for the special effects (SFX) logic 220 of FIG. 2 configured for applying blur effects in hardware is shown in FIG. 5. FIG. 5 is a block diagram showing a portion of an image signal processor configured for depth processing to generate a blur map as part of a blurring operation according to one or more embodiments of the disclosure. Inputs may be received as one or more image frames from one or more cameras received through image front ends (IFEs) 502a-c and a depth map from a depth sensor received through IFE 504. Image data from IFEs 502a-b and 504 may be stored in memory 506 internal to the SFX logic 220, although the memory 506 may alternatively be located internal to the ISP 112 or may be memory 106 external to the ISP 112. The image data may be processed by a Depth From Stereo (DFS) logic 510 to obtain a depth map stored in memory 506. The depth map, which may be merged with depth sensor data, is further processed by depth processing logic 512, such as by algorithm executing on a digital signal processor (DSP) or neural signal processor (NSP), to improve the quality of the depth map for storage in memory 506 as a blur map. Image processing engine (IPE) 514 may apply the blur map to the image data from the cameras to obtain image frames with Bokeh effect that are stored in memory 506. The resulting image frames may be retrieved from memory 506 for output as a file through coder/decoder (CODEC) 516 and/or for display 518.

The IPE 514 may perform blurring based on the blur map, in some embodiments, as a depth-dependent blur, although some embodiments may also apply blur without being depth-dependent. For example, the blur map can be generated by other non-depth related processing, e.g., by segmentation, as part of an AI-camera segmentation processing. In some embodiments, this segmentation and blurring may be applied to image frames received from a front camera, or other situation without stereo cameras, which can be used to generate depth.

Figure 6:
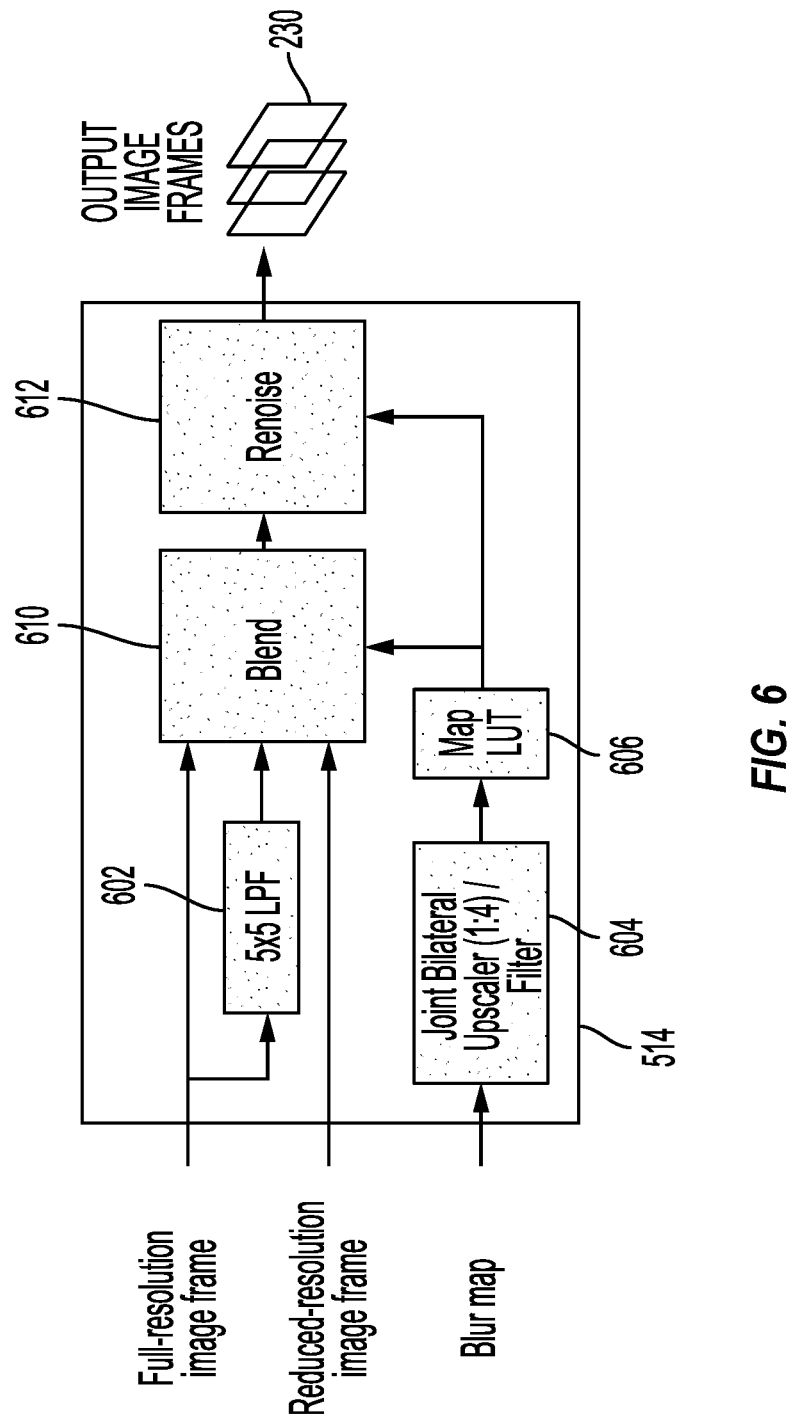
FIG. 6 is a block diagram showing a portion of an image processing engine (IPE) configured for blurring operations according to one or more embodiments of the disclosure.

The rendering performed by IPE 514 may apply depth-dependent blur using multi-resolution flow to determine output image frames as illustrated in the embodiment of FIG. 6. FIG. 6 is a block diagram showing a portion of an image processing engine (IPE) configured for blurring operations according to one or more embodiments of the disclosure. The input may include a full-resolution image frame, a reduced-resolution image frame (e.g., lower than the full-resolution such as a 2× or 4× downsampled image), and a blur map. The blur map is shown received at the reduced-resolution and upscaled through upscaler filter 604, however in other embodiments the blur map may be received at full resolution and the upscaler filter 604 omitted. The blur map is used in block 606 to determine a blur map look-up table (LUT), which is applied by the blending logic 610 to combine image data from the full-resolution image frame and the reduced-resolution image frame. The blending logic 610 may also receive a low-pass filtered version of the full-resolution image frame for use during the blending. The output of blending logic 610 may be further processed by renoise logic 612 to determine the output image frames 230. The renoise logic 612 adds random noise to areas that were blurred, such that the output image frame would have an approximately uniform noise level (e.g., similar to a DSLR camera).

In the processing of FIG. 6, the reduced resolution image frame provides a blurred image when being upscaled to the full resolution, such that the blending logic 610 may select pixels from the blurred image or the original image according to the blur map. The filtered image provides an intermediate level of blurred image, which is more blurred than the input image and less blurred than the upscaled, lower resolution image. The filtered image is another input to the blending logic 610, to be used according to the blur map.

Figures 7A, 7B, 7C:
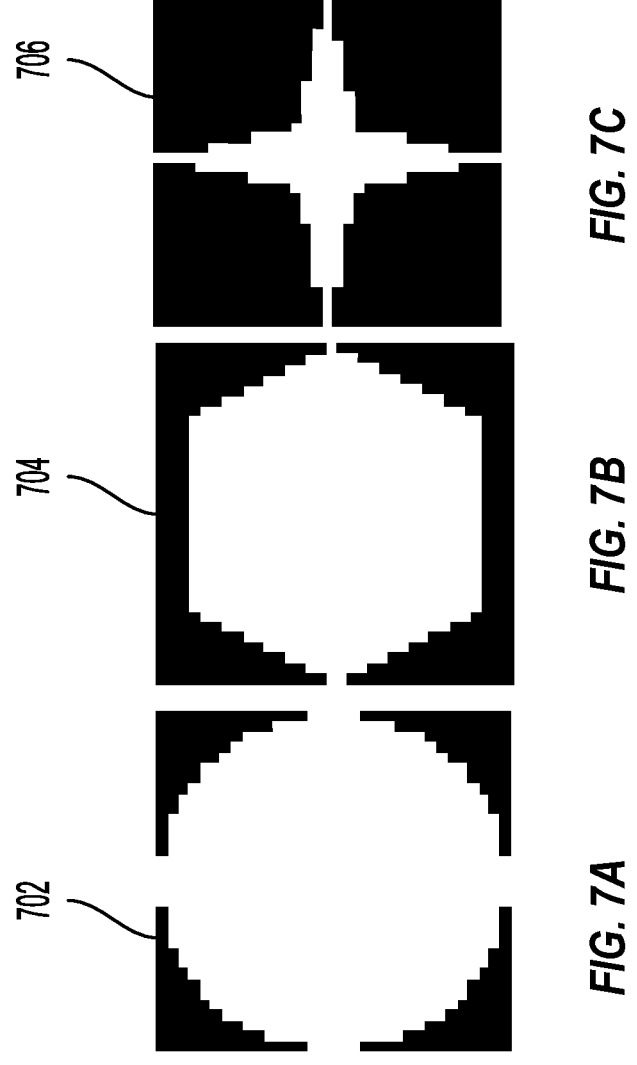
FIGS. 7A-C are illustrations showing different blur kernel shapes that may be applied during the blurring operation according to one or more embodiments of the disclosure.

The blurring performed in blend logic 610 may apply a Bokeh blur of a user-selected shape. FIGS. 7A-C are illustrations showing example blur kernel shapes that may be applied during the blurring operation according to one or more embodiments of the disclosure. One example in FIG. 7A is a blur kernel 702 with a circular shape. Another example in FIG. 7B is a blur kernel 704 with a hexagonal shape. A further example in FIG. 7C is a blur kernel 706 with a star shape.

In some embodiments, the blending logic 610, in application of a blur kernel such as one of the blur kernels 702, 704, or 706 of FIGS. 7A-C, may include logic circuitry configured to perform a splatting operation for applying the blur. When working with a pixel splatting derivative computational process, each pixel may update up to two locations in every line, although different numbers of pixels may be applied in different operations. There may be four memory accesses per input pixel (two read and two write) per line (depending on the pixel corresponding depth). In some embodiments, dual memory may be provided to the blending logic 610 to improve performance. The processing may include updating a scratch pad of data arrays in a K×K square, such as a 33×33 square, with each scratch pad line performing as a dual port memory, writing to ram a 33×1 column that current line can't change any more and/or such that vertical symmetry may update only a portion such as a 17×33 region of the scratch pad. Those 17 scratch pad lines may modify 33 lines in the memory. In another embodiment, different memory may be used with different size regions and/or without vertical symmetry.

Figure 12:
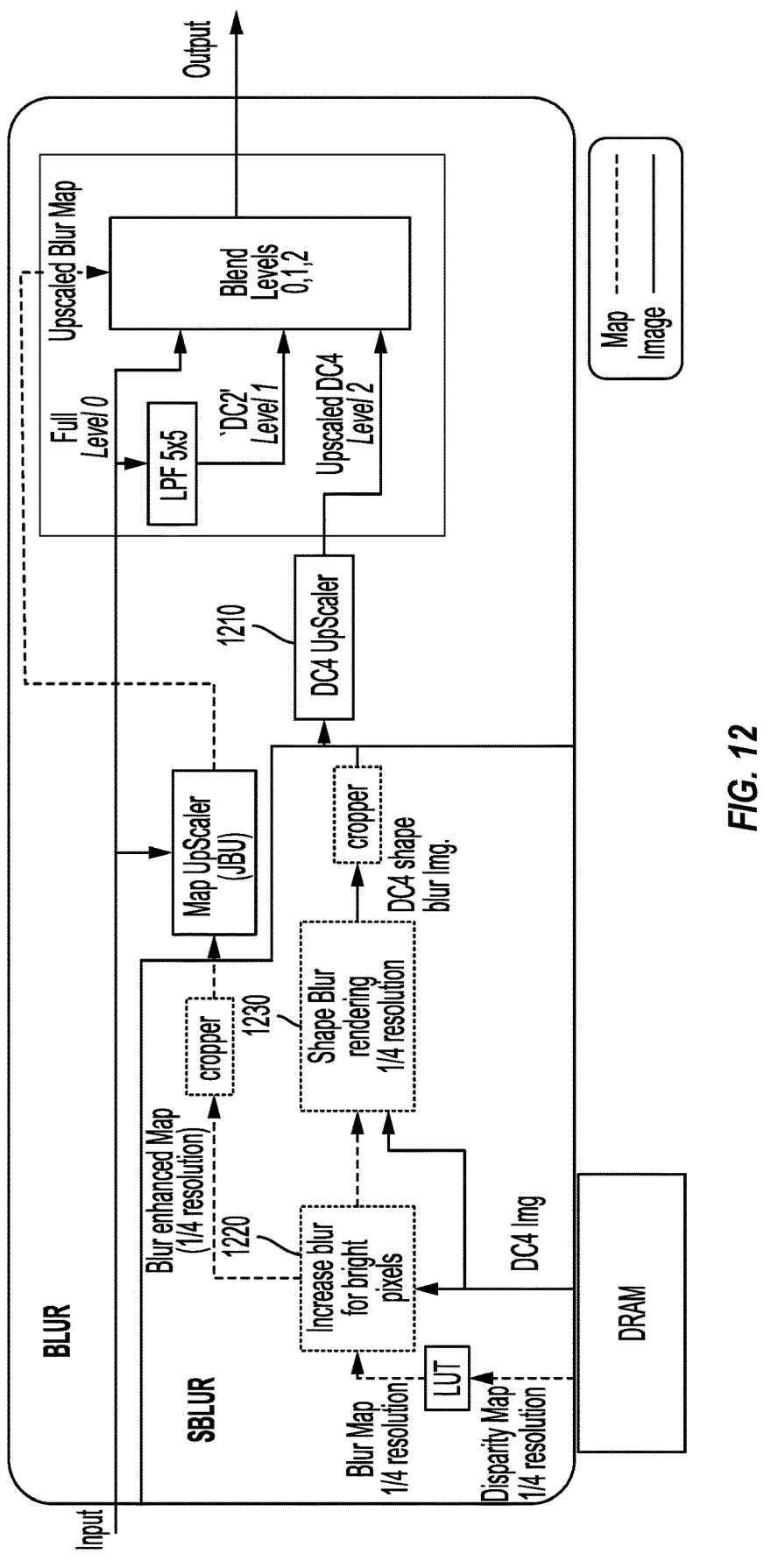
FIG. 12 shows block diagrams of a blur operation according to one or more embodiments of the disclosure.

In some embodiments, blur and brightness for bright pixels may be increased by comparing the down-sampled image with the blur map of corresponding resolution and if an image channel for a pixel is greater than a threshold value then boosting the corresponding blur map pixel by a boost ratio as described in example embodiments shown in FIG. 12.

Figure 8:
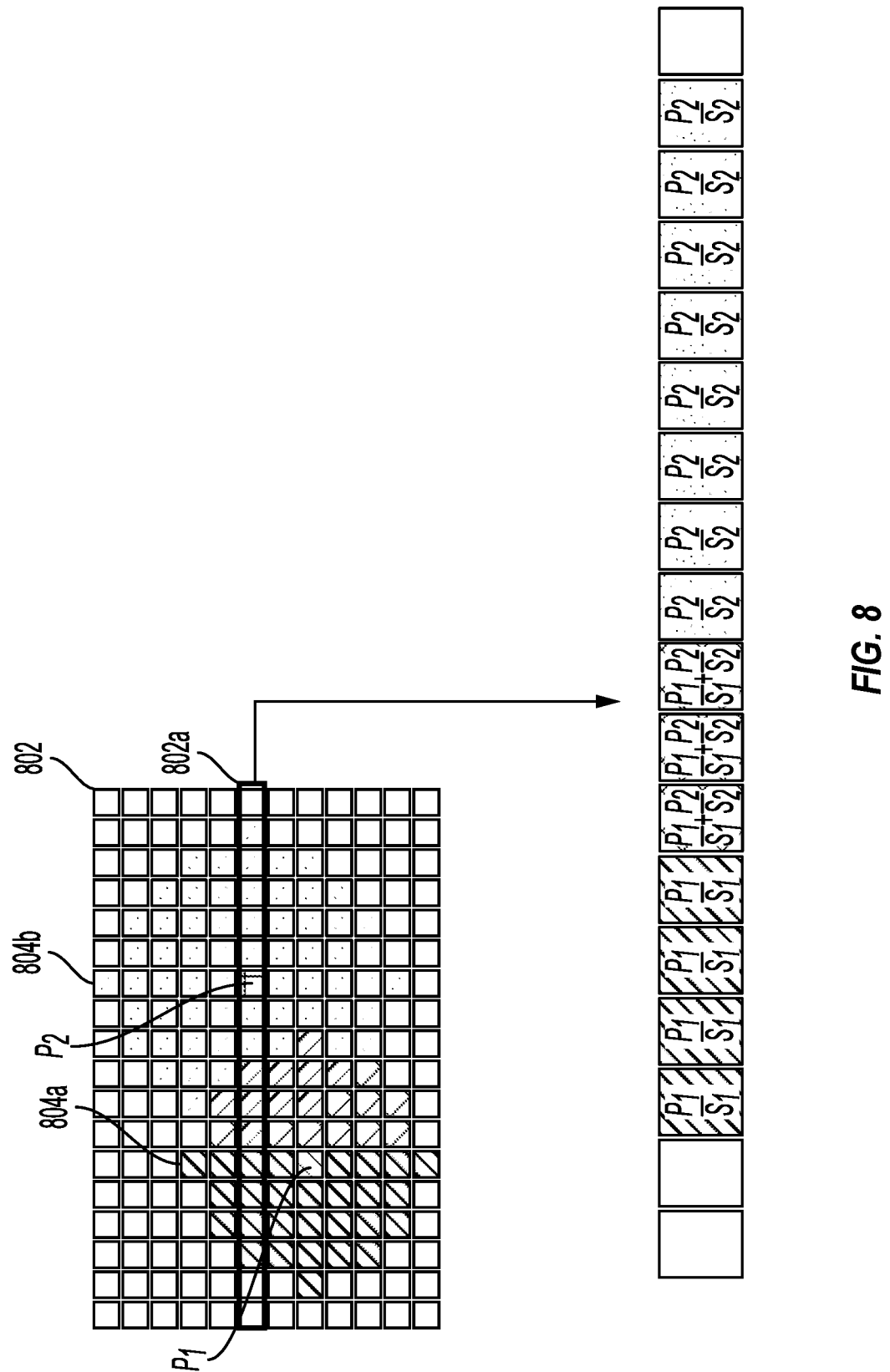
FIGS. 8-9 are data processing operations illustrating determining pixel values for blurred pixels according to one or more embodiments of the disclosure.
Figure 9:
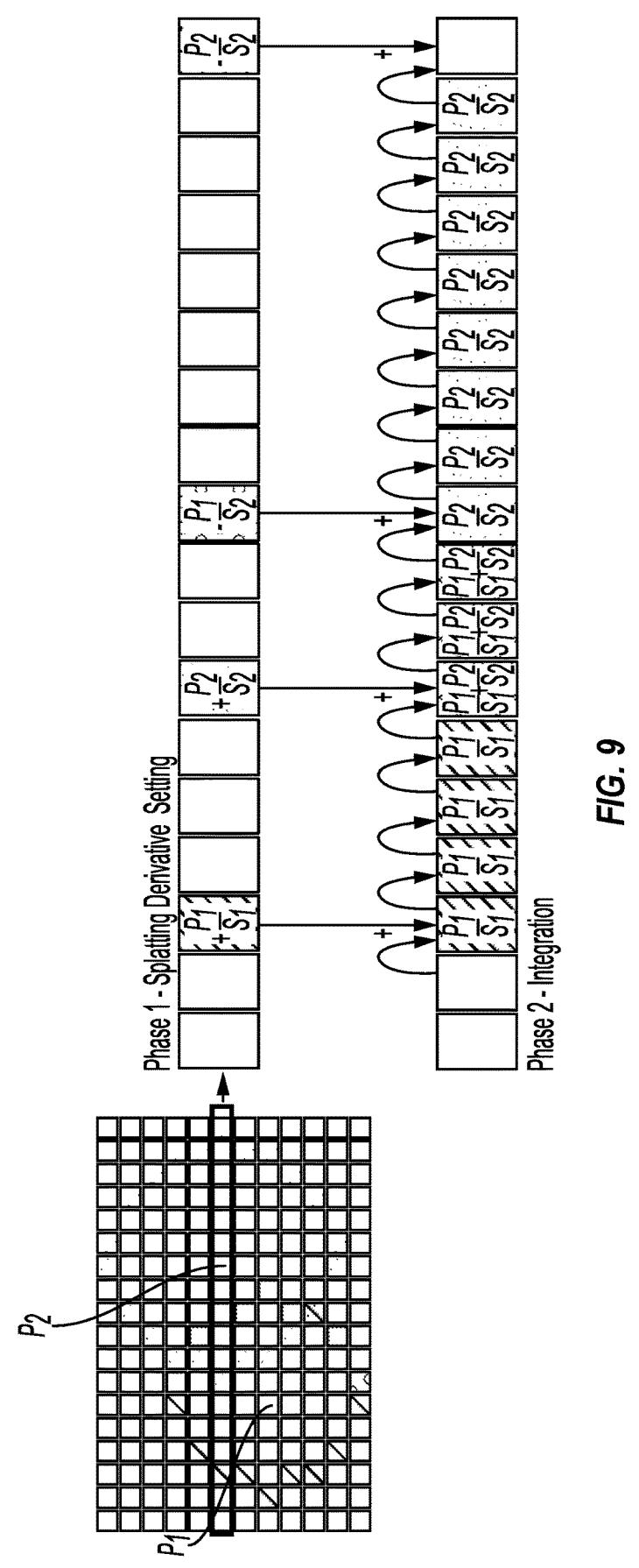

An operation for the specifical effects (SFX) logic for determining pixel values for blurred pixels is shown in FIGS. 8-9. FIGS. 8 and 9 show an algorithm for shape blur rendering having a programmable shape pattern, in which the pixels depth determine the splatting size and shape. Image data 802 may be organized as a plurality of pixels organized in rows and columns, with each pixel comprising one or more values (such as a red intensity value, a blue intensity value, and a green intensity value). FIG. 8 illustrates a blur kernel 804$a$ around pixel $P_1$ and a blur kernel 804$b$ around pixel $P_2$ and an example calculation for a row 802$a$ that applies blurring based on pixels $P_1$ and $P_2$. The pixel values for each column of the row 802$a$ are shown with $S_1$ corresponding to the area of the shape 804$a$ that pixel $P_1$ is affecting, $S_2$ corresponding to the area of the shape 804$b$ that pixel $P_2$ is affecting, $P_1$ splatting its value with a weight of 1/$S_1$, and $P_2$ splatting its value with a weight of 1/$S_2$. In some embodiments, the weight for each affected pixel is configurable. The selection of 1/S is one example application, which creates a natural effect, but a user may set this weight to other values inside the kernel, such as to create an unnatural effect.

In some embodiments, the application of blur is applied by pixel splatting derivation and integration. In some embodiments, a different shape may be applied for each depth value. This can be used, for example, to create an effect of a rotating shape or otherwise changing during depth change. This may be useful, for example, during zoom, where depth is affected by the focal length to create a transition effect. The processing for one example row calculation is shown with $S_1$ corresponding to the area of the shape that pixel $P_1$ is affecting, $S_2$ corresponding to the area of the shape that pixel $P_2$ is affecting, $P_1$ splatting its value with a weight of 1/$S_1$, and $P_2$ splatting its value with a weight of 1/$S_2$.

Figure 10A:
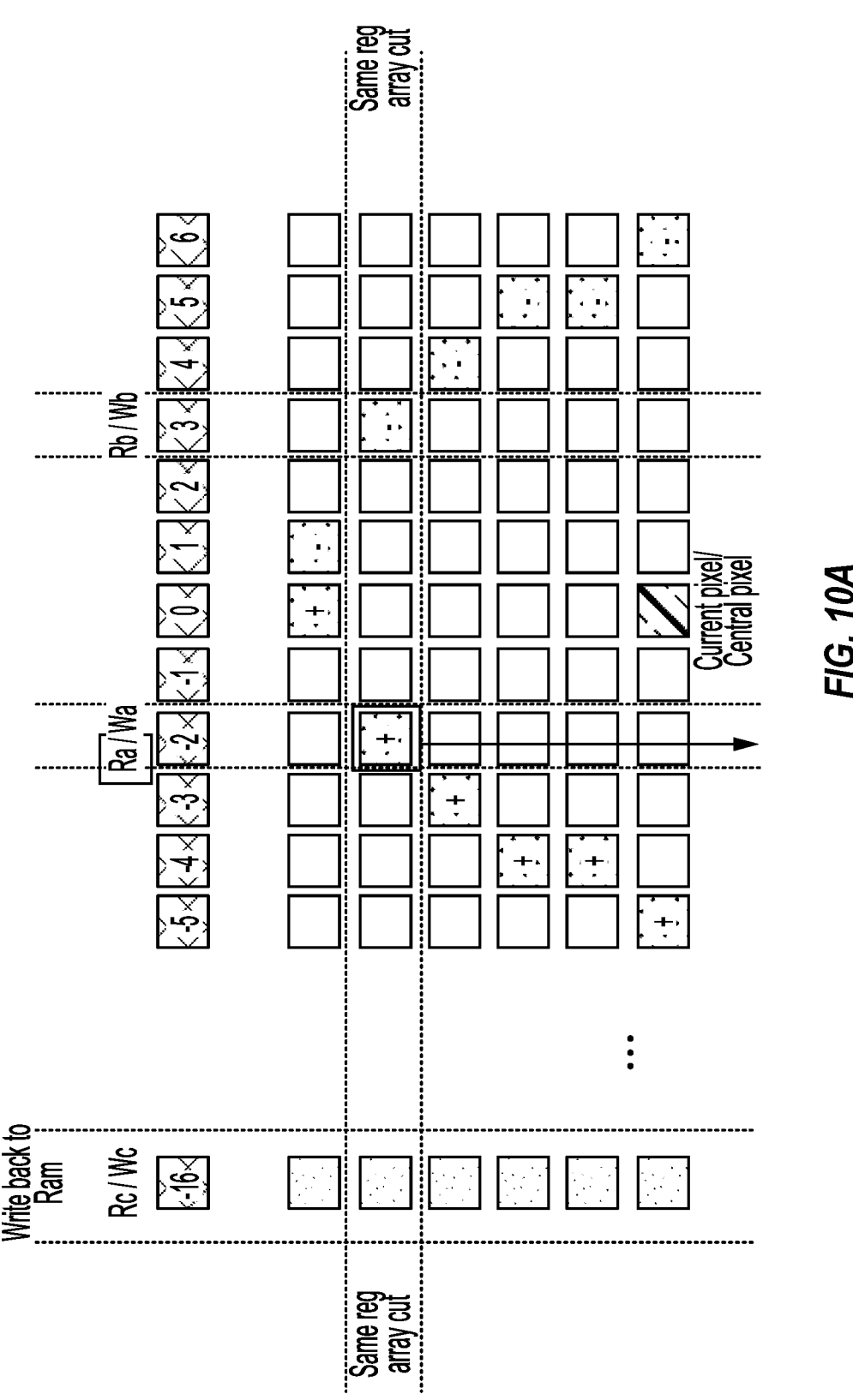
FIGS. 10A-D illustrate a shape blur rending operation according to one or more embodiments of the disclosure.
Figure 10B:
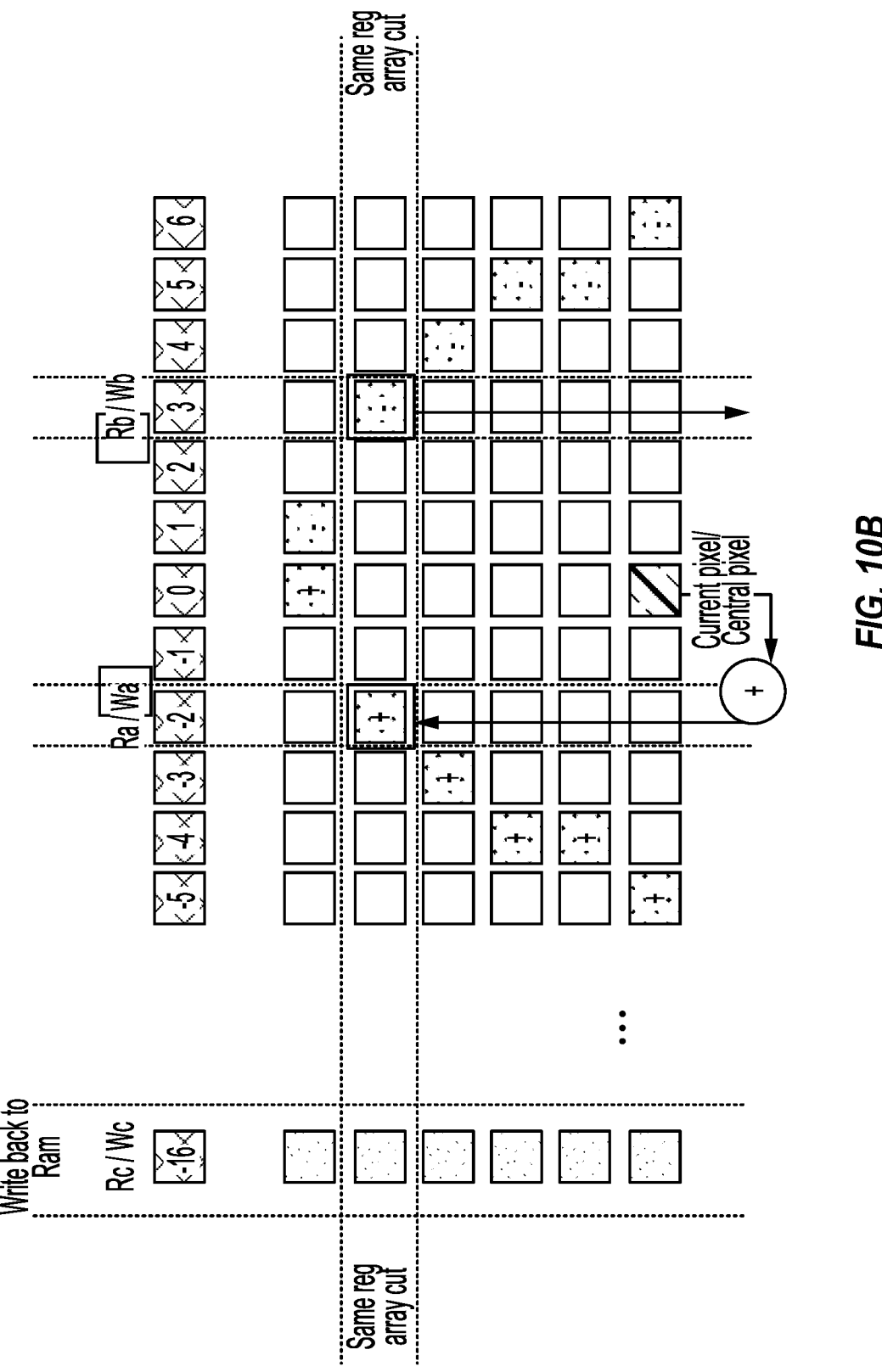
Figure 10C:
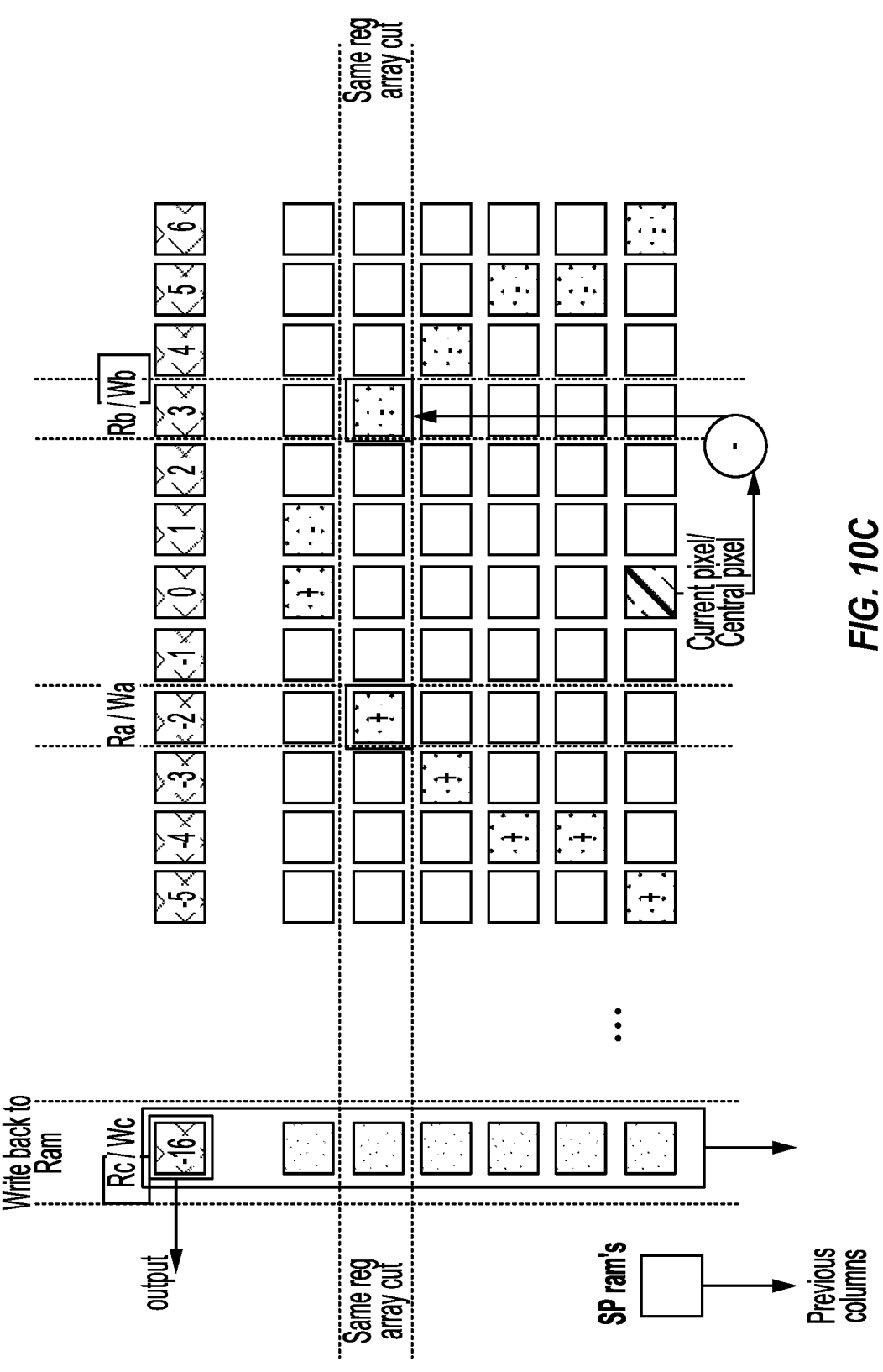
Figure 10D:
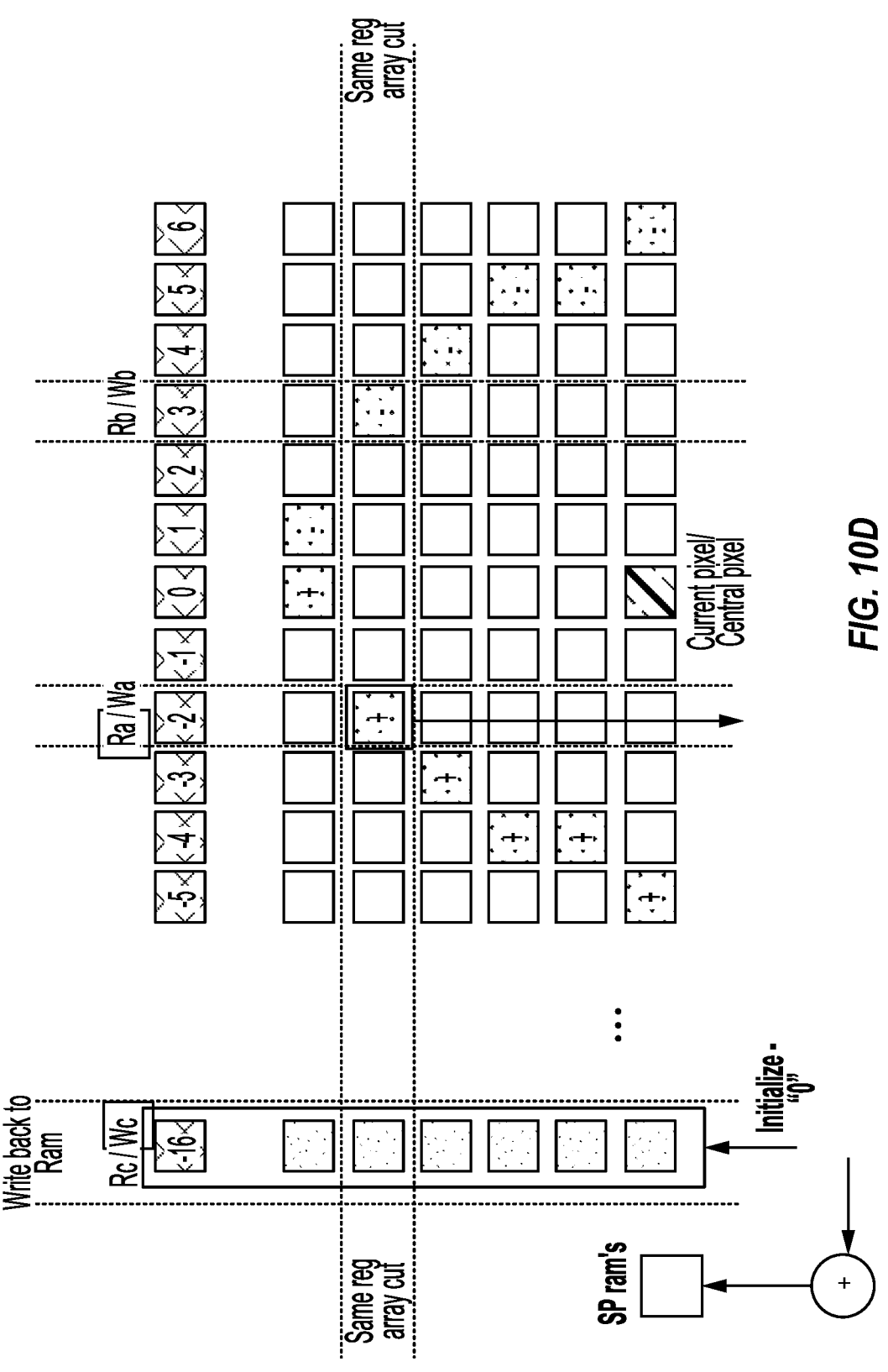

The blurring of a row of pixels may be performed in some embodiments in three clock cycles. FIGS. 10A-D illustrate a shape blur rending operation according to one or more embodiments of the disclosure. The first clock cycle may include, as shown in FIG. 10A, reading Ra. The operation may continue in FIG. 10B with a second clock cycle of write back Wa and read Rb. The operation further continues in FIG. 10C with a third clock cycle of writing back Wb and reading Rc to update the memory and determine output values. In this example, Line "−16"/column "−16" will generate the output, because the pixel indicated by this line/column can't be modified by any other pixel in the stripe. After the three clock cycles complete the pixel processing, the next pixel processing may begin as shown in FIG. 10D with a first clock cycle of a next operation performing a read of Ra and a writeback of We to an output column memory. The output calculation may be determined from:

$$P_i = \frac{\sum_j Pj \cdot Wj}{\sum_j Wj}$$

where $P_i$ is the current output pixel, $P_j$ is a pixel in the environment of 33×33 around $P_i$ and $W_j$ is the contribution of pixel $P_j$.

Figure 11:
FIG. 11 shows a blur blending operation using a pyramid fusion of multiple resolutions of the image frame according to one or more embodiments of the disclosure.

FIG. 11 shows a blur blending operation using a pyramid fusion of multiple resolutions of the image frame according to one or more embodiments of the disclosure. Shape blur may be applied on one or more layers. In some embodiments, the shape blur ("sblur") is applied to aa non-full resolution layer ((e.g., a DC4 image). In these embodiments, the reduced-resolution layers are upscaled and blended with the full-resolution layer in a processing application after the sblur operation. In some embodiments, the shape blur can be applied in full resolution.

Figure 13:
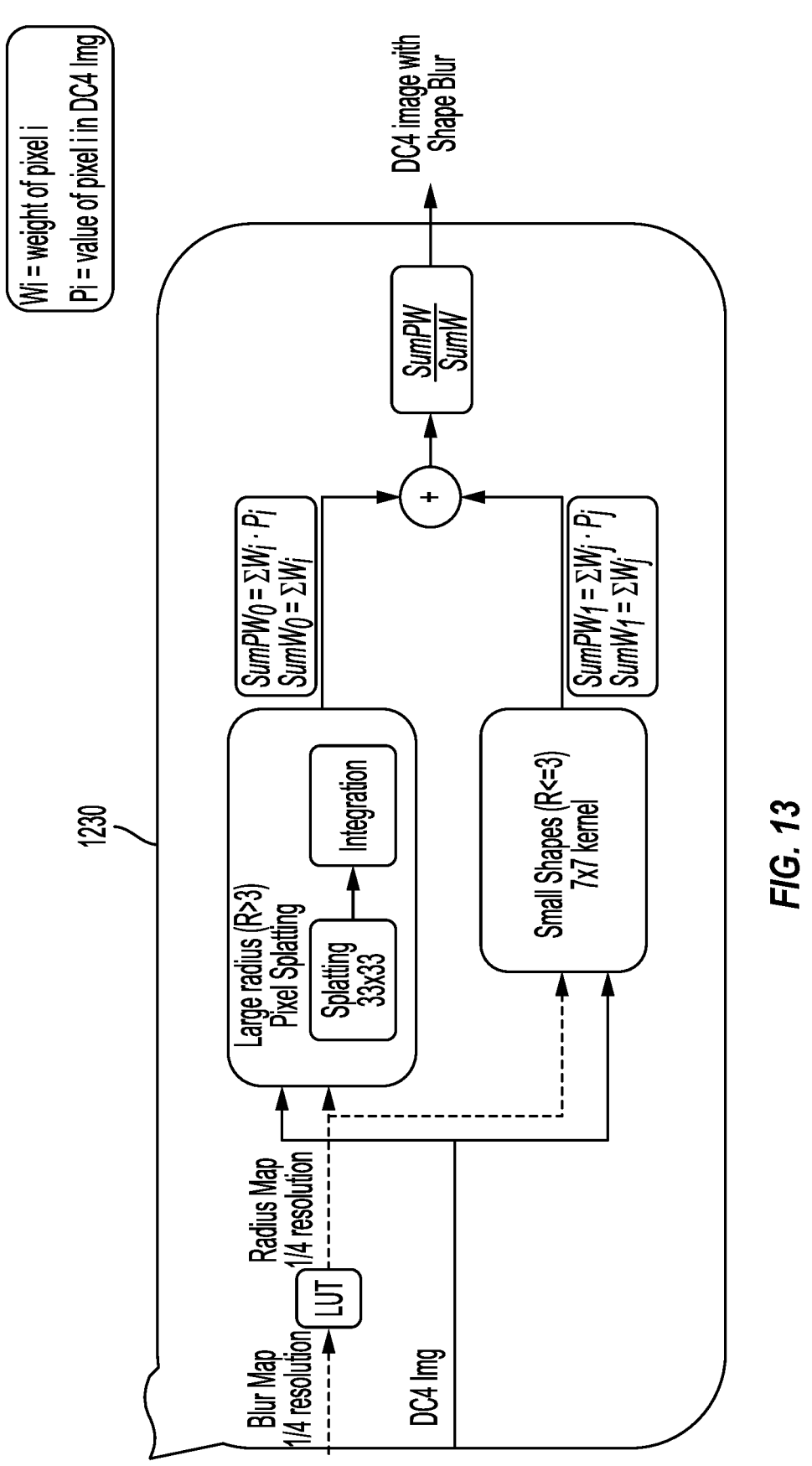
FIG. 13 shows the shape blur data processing part according to one or more embodiments of the disclosure.

FIG. 12 shows a block diagram of a blur operation according to one or more embodiments of the disclosure. In some embodiments, the performance of the BLUR module is 4 pixels per clock (ppc), with the blur DC4 upscaler 1210 1210 receiving an input pixel every 4 cycle cycles. Digital zoom may be supported as part of the blur operation, with upscaling performed in the same pipeline. Image data may be read from DRAM memory, including a DC4 image (e.g., a reduced-resolution image frame) and a disparity map (such as at the size of the reduced resolution image frame) provided to SBLUR logic circuitry and a full-resolution image frame provided to BLUR logic circuitry. The disparity map may be processed, such as through a look up table (LUT) to determine a blur map, with the blur map used in blocks 1220 and 1230 to apply blurring to the reduced-resolution image frame. In some embodiments, the blur map may be the disparity map. Although use of a disparity map or depth map are described in different embodiments, a disparity map may be used in place of a depth map. A brightness boosting 1220 may be applied to the input image before the shape blur rendering at block 1230. In some embodiments, the brightness boost may, for example in order to enlarge the shape kernel, determine if a Y channel of the input image at a pixel is greater than a threshold level and, if so, multiplying the blur map value corresponding to that pixel prior to applying the blur map at shape blur rendering of block 1230. In some embodiments, the application of a threshold may include applying two thresholds, wherein boosting is gradual between those thresholds in order to avoid flickering in case of a pixel brightness that is very close to the threshold. In some embodiments, the brightness of the pixel is additionally or alternatively multiplied by a configurable factor in order to make the shape more visible. An example of the shape blur rendering processing performed in hardware at block 1230 is shown in FIG. 13. The output of SBLUR logic circuitry is a blurred reduced-resolution image frame that is upscaled in upscaler 1210 and subsequently blended with the full-resolution image frame and a filtered version of the full-resolution image frame. The blending may implement pyramid fusion operations such as described with reference to FIG. 11.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-13 include processors, electronics devices, hardware devices, electronics components, logical circuits, memories, software codes, firmware codes, among other examples, or any combination thereof. Software shall be construed broadly to mean instructions, instruction sets, code, code segments, program code, programs, subprograms, software modules, application, software applications, software packages, routines, subroutines, objects, executables, threads of execution, procedures, and/or functions, among other examples, whether referred to as software, firmware, middleware, microcode, hardware description language or otherwise. In addition, features discussed herein may be implemented via specialized processor circuitry, via executable instructions, or combinations thereof.

Those of skill in the art that one or more blocks (or operations) described with reference to FIGS. 4 and 5 may be combined with one or more blocks (or operations) described with reference to another of the figures. For example, one or more blocks (or operations) of FIG. 4 may be combined with one or more blocks (or operations) of FIGS. 1-3. As another example, one or more blocks associated with FIG. 5 may be combined with one or more blocks (or operations) associated with FIGS. 5-13.

Those of skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits, and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, which is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that may be enabled to transfer a computer program from one place to another. A storage media may be any available media that may be accessed by a computer. By way of example, and not limitation, such computer-readable media may include random-access memory (RAM), read-only memory (ROM), electrically erasable programmable read-only memory (EEPROM), CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, opposing terms such as "upper" and "lower," or "front" and back," or "top" and "bottom," or "forward" and "backward" are sometimes used for ease of describing the figures, and indicate relative positions corresponding to the orientation of the figure on a properly oriented page, and may not reflect the proper orientation of any device as implemented.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown, or in sequential order, or that all illustrated operations be performed to achieve desirable results. Further, the drawings may schematically depict one or more example processes in the form of a flow diagram. However, other operations that are not depicted may be incorporated in the example processes that are schematically illustrated. For example, one or more additional operations may be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, some other implementations are within the scope of the following claims. In some cases, the actions recited in the claims may be performed in a different order and still achieve desirable results.

As used herein, including in the claims, the term "or," when used in a list of two or more items, means that any one of the listed items may be employed by itself, or any combination of two or more of the listed items may be employed. For example, if a composition is described as containing components A, B, or C, the composition may contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof.

The term "substantially" is defined as largely, but not necessarily wholly, what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method, comprising:
receiving, by an image signal processor, first image data;
receiving an indication of a first blur shape;
determining, by the image signal processor, a first output image frame based on the first image data by applying a photographic effect to a first image frame of the first image data, wherein applying the photographic effect comprises performing, by logic circuitry of the image signal processor, a blurring operation on the first image data based on the first blur shape;
receiving an indication of a second blur shape;
determining, by the image signal processor, a second output image frame based on the first image data by applying a photographic effect to a second image frame of the first image data, wherein applying the photographic effect comprises performing, by the logic circuitry of the image signal processor, a blurring operation on the first image data based on the second blur shape; and
storing the second output image frame.

2. The method of claim 1, wherein receiving the indication of the first blur shape comprises receiving a user input to a user interface (UI) indicating the first blur shape.

3. The method of claim 1, wherein receiving the indication of the first blur shape comprises receiving an indication of a characteristic of a region of interest in the first image frame and the characteristic corresponds to the first blur shape.

4. The method of claim 1, wherein:
receiving the first image data comprises receiving a higher-resolution image frame, a lower-resolution image frame, and a blur map, and
determining the first output image frame comprises:
performing the blurring operation on the lower-resolution image frame based on the blur map to determine a blurred image frame; and blending the higher-resolution image frame and the blurred image frame.

5. The method of claim 4, further comprising:
applying a low pass filter to the higher-resolution image frame to determine a filtered image frame,
wherein determining the first output image frame comprises blending the higher-resolution image frame, the filtered image frame, and the blurred image frame with the blur map.

6. The method of claim 5, wherein performing the blurring operation on the first image data based on the first blur shape comprises applying higher blur to pixels satisfying a criteria based on brightness and lower blur to pixels not satisfying the criteria.

7. The method of claim 6, wherein:
receiving the first image data comprises receiving the higher-resolution image frame through a first image front end (IFE) of the image signal processor (ISP);
receiving the first image data comprises receiving depth information through a second IFE of the ISP; and
the blur map is based on the depth information.

8. The method of claim 1, wherein performing the blurring operation on the first image data based on the first blur shape comprises applying higher blur to pixels satisfying a criteria based on brightness and lower blur to pixels not satisfying the criteria.

9. The method of claim 1, further comprising:
receiving, by an application processor, the second output image frame; and
executing, by the application processor, a camera application for receiving user input and determining a corrected output image frame based on the second output image frame.

10. An apparatus, comprising:
a memory; and
at least one image signal processor coupled to the memory, the at least one image signal processor configured to perform operations including:
receiving, by the image signal processor, first image data;
receiving an indication of a first blur shape;
determining, by the image signal processor, a first output image frame based on the first image data by applying a photographic effect to a first image frame of the first image data, wherein applying the photographic effect comprises performing, by logic circuitry of the image signal processor, a blurring operation on the first image data based on the first blur shape;
receiving an indication of a second blur shape;
determining, by the image signal processor, a second output image frame based on the first image data by applying a photographic effect to a second image frame of the first image data, wherein applying the photographic effect comprises performing, by the logic circuitry of the image signal processor, a blurring operation on the first image data based on the second blur shape; and
storing the second output image frame.

11. The apparatus of claim 10, wherein receiving the indication of the first blur shape comprises receiving a user input to a user interface (UI) indicating the first blur shape.

12. The apparatus of claim 10, wherein receiving the indication of the first blur shape comprises receiving an indication of a characteristic of a region of interest in the first image frame and the characteristic corresponds to the first blur shape.

13. The apparatus of claim 11, wherein:
receiving the first image data comprises receiving a higher-resolution image frame, a lower-resolution image frame, and a blur map, and
determining the first output image frame comprises:
performing the blurring operation on the lower-resolution image frame based on the blur map to determine a blurred image frame; and
blending the higher-resolution image frame and the blurred image frame.

14. The apparatus of claim 13, wherein the operations further include:
applying a low pass filter to the higher-resolution image frame to determine a filtered image frame,
wherein determining the first output image frame comprises blending the higher-resolution image frame, the filtered image frame, and the blurred image frame with the blur map.

15. The apparatus of claim 14, wherein performing the blurring operation on the first image data based on the first blur shape comprises applying higher blur to pixels satisfying a criteria based on brightness and lower blur to pixels not satisfying the criteria.

16. The apparatus of claim 15, wherein:
receiving the first image data comprises receiving the higher-resolution image frame through a first image front end (IFE) of the image signal processor (ISP);
receiving the first image data comprises receiving depth information through a second IFE of the ISP; and
the blur map is based on the depth information.

17. The apparatus of claim 10, wherein performing the blurring operation on the first image data based on the first blur shape comprises applying higher blur to pixels satisfying a criteria based on brightness and lower blur to pixels not satisfying the criteria.

18. The apparatus of claim 10, wherein the operations further include:
receiving, by an application processor, the second output image frame; and
executing, by the application processor, a camera application for receiving user input and determining a corrected output image frame based on the second output image frame.

19. A non-transitory computer-readable medium storing instructions that, when executed by an image signal processor, cause the image signal processor to perform operations comprising:
receiving, by the image signal processor, first image data;
receiving an indication of a first blur shape;
determining, by the image signal processor, a first output image frame based on the first image data by applying a photographic effect to a first image frame of the first image data, wherein applying the photographic effect comprises performing, by logic circuitry of the image signal processor, a blurring operation on the first image data based on the first blur shape;
receiving an indication of a second blur shape;
determining, by the image signal processor, a second output image frame based on the first image data by applying a photographic effect to a second image frame of the first image data, wherein applying the photographic effect comprises performing, by the logic circuitry of the image signal processor, a blurring operation on the first image data based on the second blur shape; and
storing the second output image frame.

20. The non-transitory computer-readable medium of claim 19, wherein:

receiving the first image data comprises receiving a higher-resolution image frame, a lower-resolution image frame, and a blur map, and determining the first output image frame comprises:

performing the blurring operation on the lower-resolution image frame based on the blur map to determine a blurred image frame; and blending the higher-resolution image frame and the blurred image frame.

21. The non-transitory computer-readable medium of claim 20, wherein the operations further comprise:

applying a low pass filter to the higher-resolution image frame to determine a filtered image frame, wherein determining the first output image frame comprises blending the higher-resolution image frame, the filtered image frame, and the blurred image frame with the blur map.

22. The non-transitory computer-readable medium of claim 21, wherein performing the blurring operation on the first image data based on the first blur shape comprises applying higher blur to pixels satisfying a criteria based on brightness and lower blur to pixels not satisfying the criteria.

23. An image capture device, comprising:

an image sensor;

a memory; and at least one image signal processor coupled to the memory and to the image sensor, the at least one image signal processor configured to perform operations comprising:

receiving, by the image signal processor, first image data;

receiving an indication of a first blur shape;

determining, by the image signal processor, a first output image frame based on the first image data by applying a photographic effect to a first image frame of the first image data, wherein applying the photographic effect comprises performing, by logic circuitry of the image signal processor, a blurring operation on the first image data based on the first blur shape;

receiving an indication of a second blur shape;

determining, by the image signal processor, a second output image frame based on the first image data by applying a photographic effect to a second image frame of the first image data, wherein applying the photographic effect comprises performing, by the logic circuitry of the image signal processor, a blurring operation on the first image data based on the second blur shape; and storing the second output image frame.

24. The image capture device of claim 23, wherein:

receiving the first image data comprises receiving a higher-resolution image frame, a lower-resolution image frame, and a blur map, and determining the first output image frame comprises:

performing the blurring operation on the lower-resolution image frame based on the blur map to determine a blurred image frame; and blending the higher-resolution image frame and the blurred image frame.

25. The image capture device of claim 24, wherein the operations further comprise:

applying a low pass filter to the higher-resolution image frame to determine a filtered image frame, wherein determining the first output image frame comprises blending the higher-resolution image frame, the filtered image frame, and the blurred image frame with the blur map.

26. The image capture device of claim 25, wherein performing the blurring operation on the first image data based on the first blur shape comprises applying higher blur to pixels satisfying a criteria based on brightness and lower blur to pixels not satisfying the criteria.

* * * * *